US009088420B2

(12) United States Patent
Lawrence et al.

(10) Patent No.: US 9,088,420 B2
(45) Date of Patent: Jul. 21, 2015

(54) SYSTEM AND METHOD FOR IMPROVED GEOTHENTICATION BASED ON A HASH FUNCTION

(71) Applicant: The Boeing Company, Chicago, IL (US)

(72) Inventors: David Lawrence, Santa Clara, CA (US); Michael L. O'Connor, Redwood City, CA (US); Michael L. Eglington, San Bruno, CA (US); Gregory M. Gutt, Ashburn, VA (US)

(73) Assignee: THE BOEING COMPANY, Chicago, IL (US)

( * ) Notice: Subject to any disclaimer, the term of this patent is extended or adjusted under 35 U.S.C. 154(b) by 311 days.

(21) Appl. No.: 13/653,390

(22) Filed: Oct. 16, 2012

(65) Prior Publication Data
US 2014/0108800 A1 Apr. 17, 2014

(51) Int. Cl.
*H04L 9/32* (2006.01)
*G06F 7/04* (2006.01)
*H04W 12/10* (2009.01)
*H04L 29/06* (2006.01)
(Continued)

(52) U.S. Cl.
CPC ............ *H04L 9/3297* (2013.01); *H04L 9/3239* (2013.01); *H04L 63/123* (2013.01); *H04W 12/10* (2013.01); *G06F 21/64* (2013.01); *H04L 9/3223* (2013.01); *H04L 9/3294* (2013.01); *H04L 63/08* (2013.01); *H04L 63/12* (2013.01); *H04L 2463/121* (2013.01); *H04W 12/06* (2013.01); *H04W 12/12* (2013.01)

(58) Field of Classification Search
CPC ....... H04L 63/08; H04L 9/3294; H04L 63/12; H04L 9/3223; H04L 63/123; G06F 21/64
USPC ............................... 713/168, 178, 181; 726/4
See application file for complete search history.

(56) References Cited

U.S. PATENT DOCUMENTS

2007/0079132 A1* 4/2007 Tanaka ........................... 713/178
2010/0278331 A1* 11/2010 Walker et al. .................... 380/28
(Continued)

FOREIGN PATENT DOCUMENTS

WO 2008119050 A2 10/2008

OTHER PUBLICATIONS

Combined Search and Examination Report, EP12189002, Jan. 21, 2014.
(Continued)

*Primary Examiner* — Aravind Moorthy
(74) *Attorney, Agent, or Firm* — Ameh IP; Elahe Toosi; Lowell Campbell

(57) ABSTRACT

A system and methods for time and/or location authentication are presented. A hash value is received from a client device and a hash value receiving time of the received hash value is stored. A data block is received after receiving the hash value is received, the received data block comprising alleged transmission signal data. A computed hash value of the received data block is computed, and an estimated transmission signal client receiving time by the client is calculated based on the alleged transmission signal data. A timely possession of the received data block by the client device is authenticated based on a comparison of the computed hash value to the received hash value and a comparison of the hash value receiving time to the estimated transmission signal client receiving time.

30 Claims, 13 Drawing Sheets

(51) Int. Cl.
  *G06F 21/64* (2013.01)
  *H04W 12/06* (2009.01)
  *H04W 12/12* (2009.01)

(56) References Cited

U.S. PATENT DOCUMENTS

| | | | |
|---|---|---|---|
| 2011/0193684 A1* | 8/2011 | Beeler et al. | 340/10.1 |
| 2012/0078548 A1* | 3/2012 | Salazar et al. | 702/62 |
| 2012/0213368 A1 | 8/2012 | Falk | |
| 2013/0106655 A1* | 5/2013 | Pujante Cuadrupani | 342/357.73 |
| 2013/0265191 A1* | 10/2013 | Ghinamo | 342/357.23 |

OTHER PUBLICATIONS

Ahren Studer et al: "Efficient mechanisms to provide convoy member and vehicle sequence authentication in VANETs", Security and Privacy in Communications Networks and the Workshops, 2007. Securecomm 2007. Third International Conference on, IEEE, Piscatamay, NJ, USA, Sep. 17, 2007, pp. 422-432, ISBN: 978-1-4244-0974-7.

* cited by examiner

SYSTEM AND METHOD FOR IMPROVED GEOTHENTICATION BASED ON A HASH FUNCTION

FIELD

Embodiments of the present disclosure relate generally to cyber and network security. More particularly, embodiments of the present disclosure relate to systems for time and/or location validation (authentication).

BACKGROUND

Cyber-security is becoming increasingly important as electronic systems become more engrained into everyday business and social tasks. Many previously managed business processes have expanded into electronic data processing online, which has made on-going information and computing security advancement techniques necessary in order to protect these everyday-used systems. Important documents and other data using information from social security numbers to national infrastructure related information are stored in networked systems that if accessed by an unauthorized party would have varying degrees of societal impact from nuisances to major societal infrastructure breakdown. In parallel with increased reliance on electronic systems, an increase in computer hacking motivates improving methods for protecting networked computer systems. Cyber-attacks and network penetrations are becoming more common. These frequent occurrences have brought potential dangers of network penetrations by external threats in both commercial and military environments to the forefront.

Current access control approaches are principally based on either static passwords, or are authentication based using passwords and smart badge credentials based on Public Key Infrastructure (PKI). As system attacks are often conducted by impersonating the end user (e.g., spoofing), there has been a tendency for organizations to focus on user authentication methods to curtail network data interception network vulnerabilities. These approaches continue to be vulnerable to sophisticated attacks.

SUMMARY

A system and methods for time and/or location authentication are presented. A hash value is received from a client device and a hash value receiving time of the received hash value is stored. A data block is received after receiving the received hash value, the received data block comprising alleged transmission signal data. A computed hash value of the received data block is computed, and an estimated transmission signal receiving time by the client is calculated based on the alleged transmission signal data. A timely possession of the received data block by the client device is authenticated based on a comparison of the computed hash value to the received hash value and a comparison of the hash value receiving time to the estimated transmission signal receiving time by the client.

In this manner, embodiments of the disclosure provide an authentication system that greatly reduces an opportunity for a spoofer to take advantage of a time delay that is typically experienced between a client device collecting digital samples of transmissions from a transmission source and an authentication processor receiving collected digital samples from the client device.

In an embodiment, a method for authenticating timely possession of a received data block by a client device receives a received hash value from the client device and stores a hash value receiving time of the received hash value. The method then receives a received data block after receiving the received hash value, the received data block comprising alleged transmission signal data. The method then computes a computed hash value of the received data block, and calculates an estimated transmission signal client receiving time by the client based on the alleged transmission signal data. The method further authenticates timely possession of the received data block by the client device based on a comparison of the computed hash value to the received hash value and a comparison of the hash value receiving time to the estimated transmission signal client receiving time by the client.

In another embodiment, an authentication system for authenticating timely possession of a received data block by a client device comprises a processor client-data module, a memory module, a hash function module, a satellite processing module and an authentication controller. The processor client-data module is configured to receive a received hash value from a client device and receive a received data block from the client device after receiving the received hash value, the received data block comprising alleged transmission signal data. The memory module is configured to store a hash value receiving time of the received hash value. The hash function module is configured to compute a computed hash value of the received data block. The satellite processing module is configured to calculate an estimated transmission signal client receiving time based on the alleged transmission signal data. The authentication controller is configured to authenticate timely possession of the received data block by the client device based on a comparison of the computed hash value to the received hash value and a comparison of the hash value receiving time to the estimated transmission signal client receiving time.

In a further embodiment, a non-transitory computer readable storage medium comprises computer-executable instructions for authenticating timely possession of a received data block by a client device. The computer-executable instructions measures at least one client received satellite signal. The computer-executable instructions further adds the at least one client received satellite signal to a data block. The computer-executable instructions further computes a hash value of the data block at a client device. The computer-executable instructions further transmits the hash value to a server and transmits the data block to the server after the hash value has been transmitted.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1A:
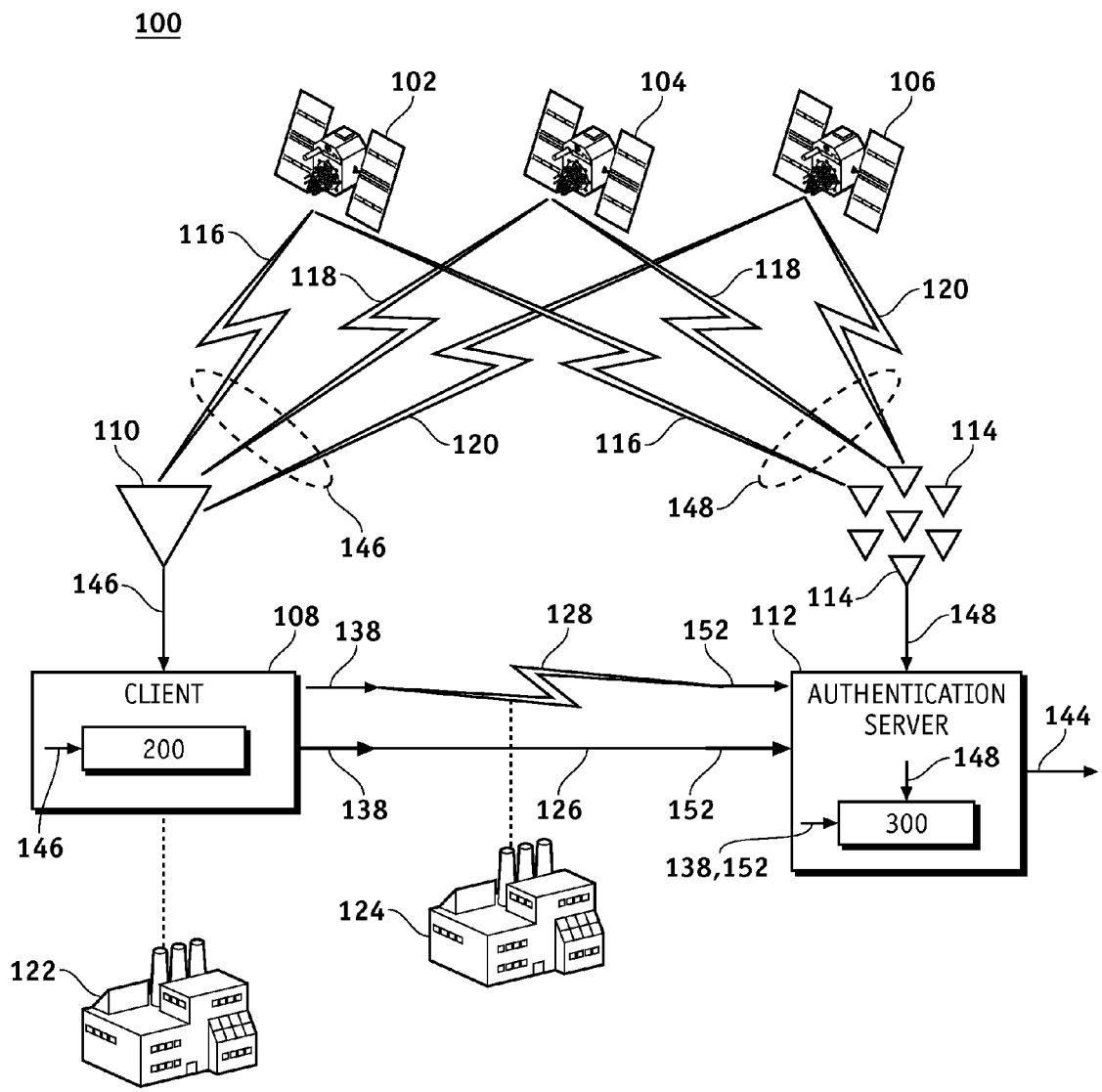
FIG. 1A is an illustration of an exemplary wireless communication environment for authenticating an asserted location and or time of a client device according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to communication systems, network protocols, global positioning systems, cloud computing, and other functional aspects of the systems (and the individual operating components of the systems) may not be described in detail herein.

Embodiments of the disclosure are described in the context of a non-limiting application, namely, an authentication system for a cyber and/or networking security application. Embodiments of the disclosure, however, are not limited, and the techniques described herein may also be utilized in other applications requiring authentication. For example, embodiments may be applicable to a desktop computer, a laptop or notebook computer, an iPad™, an iPod™, a cell phone, a personal digital assistant (PDA), a mainframe, a server, a router, an internet protocol (IP) node, a server, a Wi-Fi node, a client device, or any other type of special or general purpose computing device as may be desirable or appropriate for a given application or environment.

Furthermore, embodiments of the disclosure are described in the context of a non-limiting application, namely a client device receiving at least one transmission signal from a satellite that can be used for authentication. Embodiments of the disclosure, however, are not limited to the transmission signal from a satellite, and the transmission signal described herein may also be received from other transmission sources, such as a pseudo-satellite or a terrestrial transmission source. In some embodiments, the transmission signal comprises a radio frequency (RF) signal from a satellite.

As would be apparent to one of ordinary skill in the art after reading this description, the following are examples and embodiments of the disclosure and are not limited to operating in accordance with these examples. Other embodiments may be utilized and changes may be made without departing from the scope of the exemplary embodiments of the present disclosure.

Embodiments of the disclosure relate generally to cyber and network security applications. More specifically, embodiments provide at least one enabled client receiver and at least one enabled authentication processor with access to a hash function or more specifically a cryptographic hash function to improve time and/or location authentication. When an authentication comprises at least some location element the authentication may also be referred to as geothentication.

A need has developed for a new paradigm of access control leveraging factors beyond three factors (e.g., what you know, what you have, and who you are) of authentication by adding geospatial location/context (e.g., where you are) that can assist with adding a less spoofable approach. Such geolocation information that can be used for authentication (hence the term geothentication) may be transmitted by a client device to an authentication processor to provide further proof or assurance to a authentication processor that a client device is not tied to a spoofer or other ill-intentioned user.

The geolocation information may be related to a location of a receiver that is receiving a transmission and/or information allowing for the receiver and/or an authentication processor to calculate the location of the receiver that received the transmission. This geolocation information may comprise, for example but without limitation, a snippet of raw satellite data, at least part of a known or unknown code specific to a particular satellite beam, location information (such as latitude and longitude), time, sampled radio signal data (such as satellite RF data), information (such as unique codes) derived from sampled radio signals, and other information.

Amounts of geothentication information transmitted from a client device to an authentication server may be large compared to a communication bandwidth between them. Thus, a significant amount of time may be necessary to transmit the geothentication information. This significant amount of time may provide a spoofer with a time required to generate a false geothentication signal, for example, to create a false data set that would mislead a time and/or location of the client device to the authentication server. Thereby, an inauthentic client device may provide a false geothentication signal to try to authenticate an inauthentic user of the inauthentic client device to be in a location other than a true location of the spoofer. Alternatively, an inauthentic client device may try to provide a false geothentication signal that may be used to authenticate the client device to be in a location other than a true location of the client device.

Various methods that a spoofer might use may require a significant amount of time to generate a false geothentication signal. Since an amount of geothentication information transmitted from a client to an authentication processor (that may be part of a server) is potentially large compared to a communication bandwidth between them, a significant amount of time may be necessary to transmit the geothentication information. Embodiments of the disclosure significantly reduce a time window of opportunity for a spoofer to generate a false geothentication signal.

For example, a geothentication method may require a client device to sample 2 bits of data at 20 MHz (digital communication bandwidth of the GPS P(Y) code signal) for five satellites, to collect this for 10 milliseconds, and to send this block of data to an authentication server. A block of authentication data in this example would be 2×20×5×0.01=2 megabits every 10 milliseconds. If a digital communication bandwidth between the client device and the authentication server is a maximum of 1 megabit per second, at least 2 seconds may be needed for a 10 millisecond block of authentication data to be transferred from the client device to the authentication server. In another example, the client device may sample 4 bit complex samples of spectrum data at 10 MHz bandwidth.

A sophisticated spoofer can potentially take advantage of this time delay between collecting data at the client device and transmitting at least some portion of the collected data to the authentication server to generate and insert the false geothentication signal that could result in a false geothentication validation. A false geothentication validation may lead to the spoofer gaining access to a protected resource, such as a protected network or piece of hardware that may result in undesirable affects to those working to protect the protected resource as well as others.

Embodiments of the disclosure may use terms such as user, user device, claimant, client device, client receiver, client, or other similar term to refer to a computing device that is attempting to be validated (authenticated) whether or not it is or is not, at some point validated (authenticated). The computing device may be further attached to a person or entity that is utilizing the computing device attempting to gain access to a protected resource through means requiring the computing device to be authenticated. Furthermore, embodiments of the disclosure may use the terms data buffer content, data block, and collected digital samples interchangeably. Furthermore, embodiments of the disclosure may use the terms hash value, hash digest, cryptographic hash digest, and message digest, interchangeably.

The following distinction is made for clarity. The client device if legitimate and appropriately configured may be transmitting true (valid) data, however; from an authentication processor perspective this data is viewed as "client" data. Similarly, a spoofer, rogue, or other similar type of user device that submits invalid data (purposely or otherwise), may submit the invalid data to the authentication processor and it is still viewed as "client" data from the perspective of the authentication processor.

Embodiments of the disclosure provide an authentication system that reduces an opportunity for a spoofer to take advantage of a time delay between a client collecting digital samples of transmissions from the at least one transmission source and an authentication processor receiving at least a portion of claimed collected digital samples.

In this manner, embodiments of the disclosure provide an authentication system that significantly reduces an amount of transmission time necessary to prove timely existence of geothentication information. Thus, a spoofer may not have a required time to generate a false geothentication signal. Thereby preventing an inauthentic client device from providing a false geothentication signal indicating the inauthentic client device to be in a location other than a true location of the inauthentic client device.

FIG. 1A is an illustration of an exemplary wireless communication environment (environment 100) for authenticating an asserted location and or time of a client device according to an embodiment of the disclosure. The environment 100 may comprise satellites 102, 104 and 106, a client device 108 comprising a client receiver 200, and at least one authentication server 112 (server 112) comprising an authentication processor module 300 (authentication processor 300).

Each of the satellites 102-106 may comprise, for example but without limitation, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, an Iridium™ satellite, a GlobalStar satellite, or other satellite that may be utilized for position, navigation, or timing related applications. At least one satellite may comprise a satellite from a future constellation, such as the currently planned Iridium™ NEXT constellation. Additionally, each of the satellites 102-106 may comprise a low Earth orbiting (LEO) satellite, a medium Earth orbiting (MEO) satellite, and/or a geosynchronous Earth orbiting (GEO) satellite. An RF satellite signal may comprise at least a portion of geolocation information.

Furthermore, each of the satellites 102-106 may comprise an Iridium™ LEO satellite constellation, where each of the satellites in the constellation has an antenna geometry that transmits forty-eight (48) spot beams with a distinctive spot beam pattern. At least one transmission signal that can be used for authentication may be transmitted from at least one of the Iridium™ satellite(s) in the Iridium™ constellation. The forty-eight (48) spot beams of an Iridium™ satellite may be used to transmit localized signals that may be used for authentication to a network of nodes located on or near the Earth's surface.

The broadcasted message burst content associated with these transmissions may include random data or pseudorandom noise (PRN) data. Since a given message burst may occur within a specific satellite spot beam at a specific time, the message burst content including PRN and unique beam parameters (e.g., time, satellite identification (ID), time bias, orbit data, etc.) may be used as at least a portion of the geothentication information to authenticate a location 122 of the client device 108.

When employing one of the above-described Iridium LEO satellites, a transmission signal power may be sufficiently strong enough to allow for the transmission signals such as the satellite signals 116, 118 and 120 to penetrate into an indoor environment. This transmission signal power allows for the client device 108 to be used for many indoor applications for cyber, network, and computing security as well as authentication technologies.

Satellite signals 116, 118 and 120 transmitted from the satellites 102, 104 and 106 respectively can be processed at the client device 108 to determine the location 122 and a time of the client device 108. However, satellite signals may be spoofed in existing systems such that an existing client device senses and/or reports a false position 124.

The client device 108 comprises the client receiver 200 and is able to collect and store at least a portion of digital samples 226 (FIG. 2) of the (RF signals) client received satellite signals 146. The client device 108 computes a hash value 152 of a data block 138 comprising some or all of the digital samples 226 and is explained in more detail.

The client device 108 transmits a hash value 152 to at least one authentication server 112 for processing. The client device 108 may further transmit a data block 138, which may represent the data from the data buffer 230 (FIG. 2), to the authentication server 112 to further prove that the client device 108 is a legitimate user and that the collected samples 226 provided by the client device 108 are as anticipated based on the previously transmitted hash value 152. The transmission of the data block 138 from the client device 108 may be at (in response to) a request of the authentication server 112, such as in the form of a challenge, or it may be part of a nominal process. In some embodiments, challenges may be issued based on reception latency. Since some packets may be delayed more than others, time can be better bound when a packet is received that has a low latency. In one embodiment, a challenge is a function of latency of hash reception where lowest latency hashes trigger a challenge.

In this example, the client device 108 authenticates its time and/or location to the authentication server 112.

The hash value 152 of the data block 138 and the data block 138 are used at the authentication server(s) 112 to validate (authenticate) a time $t_2$ (FIG. 5) and/or the location 122 of the client device 108.

The transmission of the hash value 152 from the client device 108 to the authentication server 112 is used to reduce a time window of opportunity for a spoofer to tamper with the data block 138 prior to sending the data block 138 to the authentication server 112. The data block 138 comprises data needed for processing and validating the location 122 of the client device 108. The authentication server 112 uses the data block 138 to validate that the data block 138 comprises the collected digital samples 226 that had been processed by a hash function module 232 (FIG. 2) to create the transmitted hash value 152. Once the data block 138 has effectively been validated, the data block 138 can reliably be processed to authenticate the time $t_2$ and/or the location 122 of the client device 108.

The client device 108 may support many consumer applications. For example, many financial transactions utilize mobile devices such as cell phones or laptops as the client device 108 indoors such as within a city building. The client device 108 may comprise wired or wireless communication devices such as, but without limitation, a desktop computer, a laptop or notebook computer, an iPad™, an iPod™, a cell phone, a personal digital assistant (PDA), a mainframe, a server, a router, an internet protocol (IP) node, a server, a Wi-Fi node, a client, or any other type of special or general purpose computing device that comprises the client receiver 200 capable of receiving the client received transmission signals such as the satellite signals 146, and as may be desirable or appropriate for a given application or environment.

In this document, the transmitted data block 138 may refer to the data block 138 when the data block 138 is sent from the client device 108 to the authentication processor 300. The received data block 138 may refer to the data block 138 when the data block 138 is received at the authentication processor 300. Similarly the transmitted hash value 152 may refer to the hash value 152 when the hash value 152 is sent from the client device 108 to the authentication processor 300. The received hash value 152 may refer to the hash value 152 when the hash value 152 is received at the authentication processor 300. Also, server 112, and authentication server 112 may be used interchangeably.

The authentication server 112 is configured to receive the hash value 152 alleged to be an output of the hash function module 232 of the client device 108 seeded by the digital samples 226 collected by the client device in the data block 138 and authenticate possession of the received data block 138 by the client device 108 at the time $t_2$ as explained in more detail below. The authentication server 112 may receive the hash value 152 and the data block 138 via a wired communication link 126, a wireless communication channel 128, through an Internet protocol, or a combination thereof.

The authentication server 112 comprises the authentication processor 300 and may also be configured to receive the satellite signals 116-120 through server received satellite signals 148 via a server antenna 114. The authentication processor 300 is configured to receive the received hash value 152 and the received data block 138 comprising some or all of the digital samples 226 from the client device 108, and authenticate the time $t_2$ and/or the location 122 of the client device 108 if a timely possession of the received data block 138 by the client device 108 is authenticated as explained in more detail below. A server received satellite signal 148 and a processor received satellite signal 148 may be used interchangeably in this document. Similarly a server, an authentication server, an authentication processor, and a processor may be used interchangeably in this document.

Figure 7:
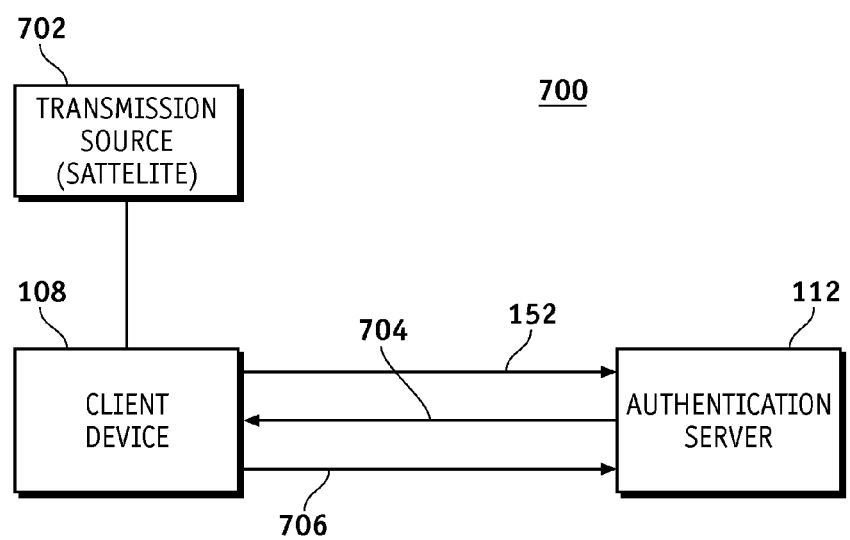
FIG. 7 is an illustration of a schematic block diagram showing an authentication challenge process according to an embodiment of the disclosure.

In at least some embodiments, the authentication processor 300 may challenge the client device 108, for example, by requiring the client receiver 200 to transmit the transmit hash value 152 and the collected digital samples from the data buffer 230 on-demand such that the authentication processor 300 of the authentication server 112 can validate the time $t_2$ and/or the location 122 of the client device 108 as it deems necessary as explained in the context of discussion of FIG. 7.

In some embodiments, an authentication process may further comprise at least one of the following: at least one client device such as the client device 108 receiving access to a protected resource if the authentication result is deemed favorable; the client device 108 being restricted from access to the protected resource if the authentication result is deemed not favorable; and at least one authentication processor such as the authentication processor 300 challenging the client device 108 if the authentication result is deemed questionable and/or unfavorable.

Figure 1B:
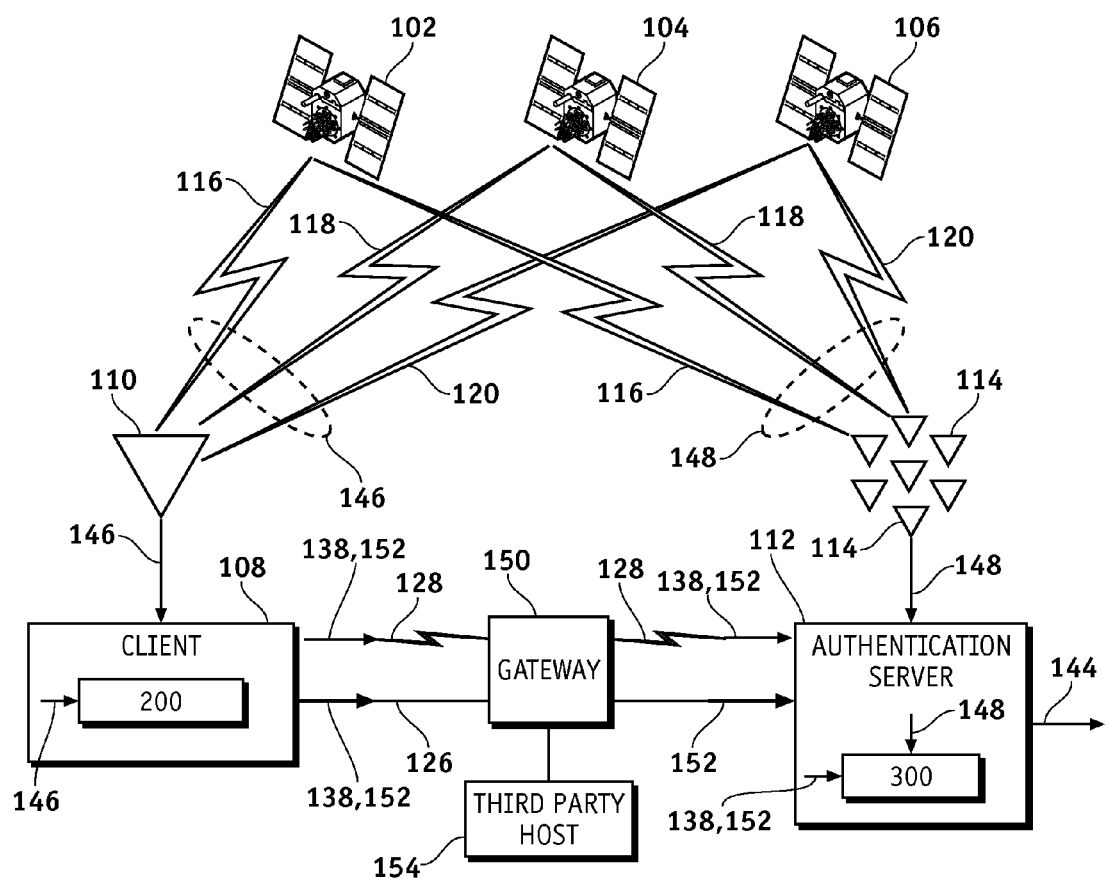
FIG. 1B is an illustration of an exemplary wireless communication environment for authenticating an asserted location and or time of a client device according to an embodiment of the disclosure.

FIG. 1B is an illustration of an exemplary wireless communication environment 100B for authenticating an asserted location and or time of a client device according to an embodiment of the disclosure. The embodiment shown in FIG. 1B may have functions, material, and structures that are similar to the embodiments shown in FIG. 1A. Therefore common features, functions, and elements may not be redundantly described here.

One skilled in the art should also recognize that alternatives other than the embodiment shown in FIG. 1A may be used. In at least one embodiment, an intermediary may exist between the client device 108 and the authentication server 112, such as a gateway 150. The gateway 150 may receive information from the client device 108 and forward the received information to the authentication processor 300 for processing. In one embodiment, the hash value 152 may be sent to the gateway 150, where the gateway 150 time stamps the hash value 152, and sends hash value 152 to the authentication processor 300 as explained in more detail below in the context of discussion of FIG. 3 below. This data transfer can be done in a secure manner such as via encryption to maximize an ability of the authentication processor 300 to trust the hash value 152 that is being received.

Authentication information is then generated and sent from the authentication server(s) 112 to the gateway 150 via an authentication message 144. The gateway 150 then uses the authentication message 144 to determine whether to provide network or other access rights to the client device 108.

In one embodiment, the gateway 150 and the authentication server(s) 112 reside in different locations and communicate through a public or semi-public communication network via the wired communication link 126, the wireless communication channel 128, an Internet protocol, or a combination thereof. In another embodiment, the gateway 150 and the authentication server(s) 112 communicate through a virtual private network (VPN) connection or through some other method of encryption that would enable the authentication message 144 between the gateway 150 and the authentication server(s) 112 to be trusted.

In one embodiment, the authentication processor 300 is part of or tied to the gateway 150. It should be noted that an authentication result may be information allowing a separate processor such as the authentication processor 300 to make the authentication message 144. For example, the gateway 150 may use the authentication message 144 to determine whether the client device 108 should have access to at least one protected resource and to what degree of access privileges the client device 108 may have using defined policies or it may be the authentication decision itself. In at least one embodiment, the authentication processor 300 or the gateway 150 may be further tied to an authorization processor such as a third party host 154.

Figure 2:
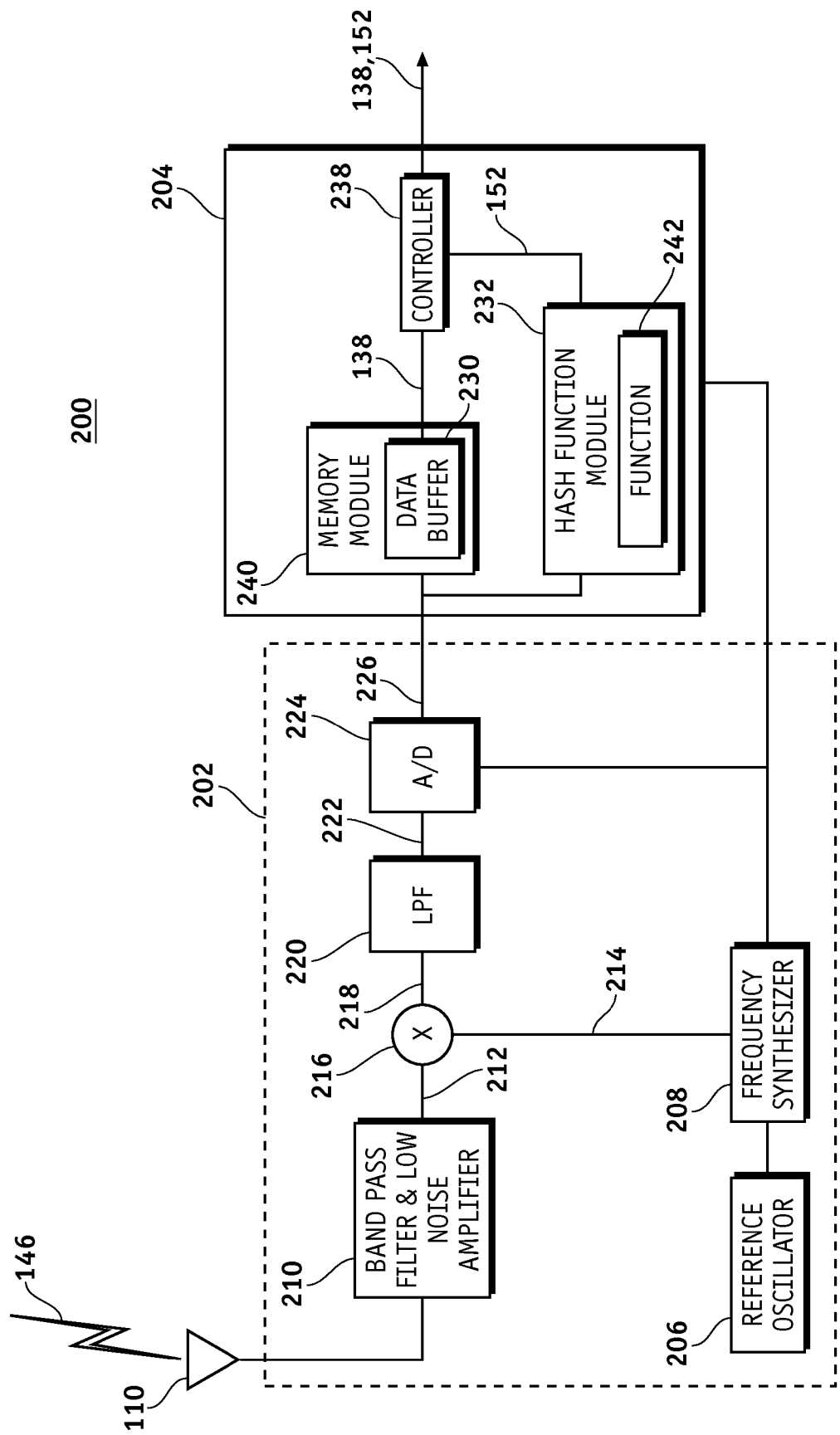
FIG. 2 is an illustration of an exemplary simplified functional block diagram of a client device according to an embodiment of the disclosure.

FIG. 2 is an illustration of an exemplary simplified functional block diagram of the client receiver 200 (system 200) shown in FIG. 1 according to an embodiment of the disclosure. The client receiver 200 may comprise a client data sample generator 202, and a client processing module 204 comprising: a memory module 240 comprising a data buffer 230, a hash function module 232 comprising a function 242, and a client controller 238.

The client receiver 200 is configured to collect digital samples 226 of transmission signals such as the satellite signals 116-120 from at least one transmission source such as the satellites 102-106, store at least a portion of the collected digital samples 226 in the data buffer 230, generate the hash value 152 (e.g., a message digest) from at least a portion of the collected digital samples 226 using the function 242 (e.g., a cryptographic hash function), transmit the hash value 152 at the output of the hash function module 232 to the authentication processor 300, and transmit the collected digital samples 226 from the data buffer 230 to the authentication processor 300 after transmitting the hash value 152. If there are multiple communication channels both the hash value 152 and the data block 138 can be sent significantly simultaneously, but generally the hash value 152 would likely be received first as the hash value 152 generally comprises less data than the data block 138.

The client device 108 may comprise means such as the internet, to transmit the hash value 152 and the collected digital samples 226 in the data block 138 to the authentication processor 300.

The client data sample generator 202 comprises a reference oscillator 206, a frequency synthesizer 208, a band pass filter 210, a multiplier 216, a low pass filter (LPF) 220, and an analog to digital (A/D) converter 224. The reference oscillator 206 and the frequency synthesizer 208 are configured to provide timing references for the client receiver 200. The client received satellite signals 146 received by the antenna 110 are passed through the low noise amplifier and band pass filter 210. An output signal 212 of the low noise amplifier and band pass filter 210 and an intermediate frequency 214 from the frequency synthesizer 208 are multiplied at the multiplier 216 to provide a synthesized signal 218. The synthesized signal 218 is passed through the low-pass filter 220 resulting in a signal that represents the original signal that has been down converted to a lower frequency band to provide a baseband signal 222. The baseband signal 222 is sampled by the A/D converter 224 to generate the digital samples 226 which are collected and stored by the client processing module 204.

The client processing module 204 is configured to compute the hash value 152, transmit the hash value 152 to the authentication server 112, and transmit the data block 138 to the authentication server 112 after the hash value 152 has been transmitted.

The data buffer 230 is configured to accumulate the digital samples 226. The digital samples 226 are also used as an input to the hash function module 232 to compute the hash value 152

The hash function module 232 is configured to compute the hash value 152. The hash function module 232 computes the hash value 152 based on the digital samples 226 collected in the data block 138 and seeded as an input to the hash function module 232.

The hash function module 232 is selected such that it makes it infeasible (e.g., extremely difficult and therefore time consuming) for a spoofer or otherwise ill-intentioned user to modify existing data or to generate a new set of data that would generate a specific cryptographic hash function output (e.g., a specific message digest). The hash function module 232 may comprise a (secure) function 242 to compute the hash value 152. The function 242 used to compute the hash value 152 comprises a cryptographic hash function; thereby the hash value 152 comprises a cryptographic hash value. The output of the hash function module 232 namely the hash value 152 needs to be repeatable such that should the same block of data be used to seed the hash function module 232 more than once the hash value 152 is the same.

The function 242, may comprise for example but without limitation, a Secure Hash Algorithm, a SHA-1 algorithm, a SHA-2 algorithm, a SHA-3 algorithm, a SHA-224 algorithm, a NAVAL algorithm, a MD5 algorithm, a RIPEMD algorithm, or other algorithm capable of generating a repeatable hash value such as the hash value 152 for the same data block such as the data block 138.

The client controller 238 is configured to interface with and manage the data buffer 230 and the hash function module 232. The client controller 238 is configured to clear the data buffer 230 and initialize the cryptographic hash function module 232, which may be an "atomic" operation. By clearing the data buffer 230 and initializing the hash function module 232 before accepting any additional data into these processes, the client processing module 204 can ensure that identical data is used as input for both the data buffer 230 and the cryptographic hash function module 232. An output of the hash function module 232 which is the hash value 152 is then guaranteed to be derived from the exact data in the data buffer 230.

The client controller 238 may perform this (e.g., atomic) operation very quickly between each of the digital samples 226 (e.g., by temporarily stopping the sampling process, potentially dropping samples "on the floor"), or by temporarily buffering the digital samples 226 in a separate buffer until the (e.g., atomic) operation has been completed and then allowing the digital samples 226 through as inputs to both the data buffer 230 and the cryptographic hash function module 232.

The client controller 238 is also configured to (e.g., atomically) capture and read the digital samples 226 in the data buffer 230 and the hash value 152, and to transmit the content of the data buffer 230 via the data block 138, and the hash value 152 to at least one authentication server(s) 112. An important point here is that no new data is input into the data buffer 230 or to the hash function module 232 while the client controller 238 is reading data. Therefore, the hash value 152 of the hash function module 232 is guaranteed to be derived from exact data in the data buffer 230.

Figure 3:
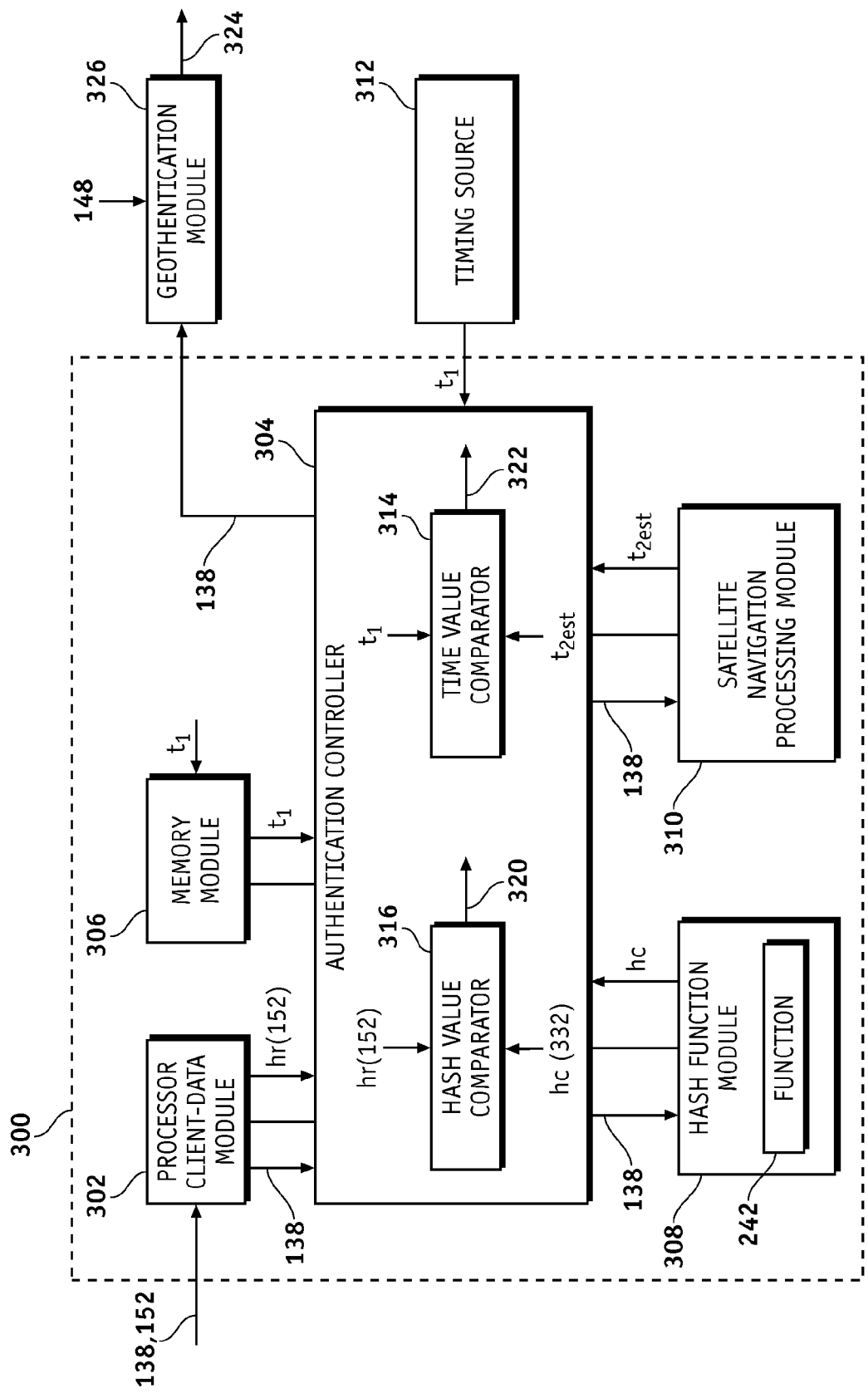
FIG. 3 is an illustration of an exemplary simplified functional block diagram of a server authentication processor according to an embodiment of the disclosure.

FIG. 3 is an illustration of an exemplary simplified functional block diagram of the server authentication processor 300 (authentication processor 300, system 300) of FIG. 1 according to an embodiment of the disclosure. The authentication processor 300 may comprise a processor client-data module 302, an authentication controller 304 (controller 304), a memory module 306, a hash function module 308, and a satellite navigation processing module 310 (transmission signal processing module 310). Other functionality, such as a timing source 312 and a geothentication module 326 may also be included in the authentication processor 300, or they may be implemented outside of the authentication processor 300. Processor 300, authentication processor module 300, authentication processor 300, server authentication processor 300, and system 300 may be used interchangeably in this document.

The system 300 further comprises a receiver mechanism tied to the authentication processor 300 to receive the hash value 152 and the data block 138. The system 300 may further generate the authentication result using at least a portion of the received digital samples 226 collected in the data block 138. In some embodiments, the authentication processor 300 may further be tied to a means to transmit to the client device 108 for instances such as challenging.

The processor client-data module 302 is configured to receive the received hash value (hr) 152 from the client device 108, and receive the received data block 138 from the client device 108 after receiving the received hash value 152. The received data block 138 comprises alleged transmission signal data comprising some or all of the client received signal samples 226 (digital samples 226) from the client device 108.

The timing source 312 is configured to create a time stamp of a time that the hash value 152 was received at a hash value receiving time ($t_1$) at the authentication processor 300.

As mentioned above, an intermediary device or network such the gateway 150 may comprise means to track the hash value receiving time ($t_1$) (e.g., a time of arrival of the hash value 152) in a way that the authentication processor 300 can utilize, such as means to time stamp an (incoming) hash value 152.

In an alternate embodiment, the hash value 152 may be sent by the client device 108 to the gateway 150. The gateway 150 may then substantially immediately forward the hash value 152 to the authentication processor 300 with a substantially minimum delay. Then, the authentication processor 300 may time stamp the hash value receiving time ($t_1$). A total delay may increase, but can still be less than a threshold time. For example, less than an approximate time a spoofer may take to spoof a signal.

The hash function module 308 is configured to compute a computed hash value (hc) 332 of the received data block 138.

In an embodiment, the computed hash value (hc) 332 comprises a cryptographic value, and a function 242 used to compute the computed hash value 332 comprises a same hash function that the client device 108 utilizes as explained above in the context of discussion of FIG. 2.

The satellite navigation processing module 310 (transmission signal processing module 310) is configured to calculate an estimated transmission signal client receiving time ($t_{2est}$) at the client device 108 based on the alleged transmission signal data in the received data block 138.

The authentication controller 304 comprises a hash value comparator 316 and a time value comparator 314.

The hash value comparator 316 is configured to compare the computed hash value (hc) 332 to the received hash value (hr) 152 and output a hash value comparison result 320.

The time value comparator is configured to compute a time difference 322 ($t_1 - t_{2est}$).

The authentication controller 304 is configured to authenticate timely possession of the received data block 138 by the client device 108 based on the hash value comparison result 320 and/or the time difference 322.

In this manner, if the received hash value 152 and the computed hash value 322 match, and if the time difference 322 ($t_1 - t_{2est}$) is below a time threshold value, the authentication processor 300 authenticates possession of the received data block 318 by the client device 108 at time ($t_2$) shortly before the hash value receiving time ($t_1$). The time threshold value is explained in more detail in the context of discussion of FIG. 10 below.

The authentication controller 304 may also be configured to issue a challenge based on a reception latency of the received hash value 152. For example, the authentication controller 304 may issue the challenge based on a lowest latency hash value and/or a random challenge. The satellite navigation processing module 310 and/or the authentication controller 304 invalidates possession of the data block 138 by the client device 108 if the time difference 322 is above the time threshold value.

If the authentication processor 300 authenticates possession of the received data block 138 by the client device 108 at time ($t_2$), the received data block 138 is then passed to the geothentication module 326 by one of the satellite navigation processing module 310 or the authentication controller 304 for time and/or location authentication of the client device 108.

The geothentication module 326 (authentication module) is configured to authenticate or geothenticate time and/or the location 122 of the client device 108 based on the contents of the alleged transmission signal data in the received data block 138 comprising the client received signal samples 226 (digital samples 226) from the client device 108.

The geothentication module 326 may be implemented in the authentication processor 300 or by an off-board processor and may be configured to authenticate the time and the location 122 of the client device 108.

In an embodiment, the geothentication module 326 measures at least one server received satellite signals 148 and compares the alleged transmission signal data in the received data block 138 to the server received satellite signals 148 to provide a signal comparison result 324, and authenticate a time and/or the location 122 of the client device 108 based on the signal comparison result 324. Geothentication processes of the geothentication module 326 are described in more detail in U.S. Pat. Nos. 8,068,533, 8,068,534, and 7,969,354 contents of which are incorporated by reference herein.

The memory module 306 is configured to store, for example but without limitation, the received hash value 152, the hash value receiving time $t_1$ of the received hash value 152, the estimated transmission signal client receiving time ($t_{2est}$) the received data block 138, the hash value comparison result 320, the time difference 322, the signal comparison result 324, contents of the alleged transmission signal data in the received data block 138 comprising some or all of the digital samples 226, and other data.

In further embodiments, once the received data block 138 has effectively been validated, the authentication controller 304 may continue to process the digital samples 226 in the received data block 138 to authenticate the location 122 and/or time $t_2$ of the client device 108. The authentication controller 304 is also configured to invalidate possession of the received data block 138 by the client device 108 at a time $t_2$ based on the time difference 322.

The validity of time and/or the location 122 of the client device 108 is deduced by at least one of the following: a hash value receiving time ($t_1$) which is the time of arrival (TOA) of the hash value 152 transmitted from the client device 108 to the authentication processor 300, an estimated transmission signal client receiving time ($t_{2est}$) by the client device 108 based on the alleged transmission signal data from at least one transmission source such as the satellite 102-106, the time difference 322 is below a defined time threshold, the calculated hash value 336 is the same as the receive hash value 152 transmitted from the client device 108 to the authentication processor 300, and the authentication message 144 based on processing the contents of the alleged transmission signal data from the client receiver that is received at the client device 108 from at least one transmission source.

In some embodiments, the authentication processor 300 receives the received hash value 152 that is derived using the hash function/function 242 and the collected digital samples 226 from the client device 108 that are received from the received satellite signal 146 that contains at least a portion of geolocation information. Furthermore, the authentication processor 300 receives the collected digital samples 226 from the client device 108, comprising a portion of the geolocation information.

Some embodiments of the system 200-300 may comprise additional components and elements configured to support known or conventional operating features that need not be described in detail herein. In the embodiment shown in FIGS. 2-3, the systems 200-300 can be used to transmit and receive data in the wireless communication environment 100. Systems 200-300 may have functions, material, and structures that are similar to the embodiments shown in FIG. 1. Therefore common features, functions, and elements may not be redundantly described here.

The client processing module 204, the authentication processor module 300 and the authentication controller 304 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. The client processing module 204, the authentication processor module 300 and the authentication controller 304 comprise processing logic that is configured to carry out the functions, techniques, and processing tasks associated with the operation of the systems 200-300.

In particular, the processing logic is configured to support the authentication method described herein. For, example the client processor module 204 may be suitably configured to send the data block 138 and the hash value 152 from the client device 108 to the authentication server 112 via a client transmit antenna (not shown). For another example, the authentication processor 300 may be suitably configured to send the authentication message 144 to the gateway 150, to another server, or to the client device 108 via a server transmit antenna (not shown), internet, or other means. Furthermore, the steps of a method or algorithm described in connection with the embodiments disclosed herein may be embodied directly in hardware, in firmware, in a software module executed by the client processing module 204, and the authentication processor module 300, or in any combination thereof.

The memory modules 240/306, may be realized as a non-volatile storage device (non-volatile semiconductor memory, hard disk device, optical disk device, and the like), a random access storage device (for example, SRAM, DRAM), or any other form of storage medium known in the art. The memory module 240/306 may be coupled to the client processing module 204, and the authentication processor module 300 respectively such that the processor modules 204/300 and the authentication controller 304 can read information from, and write information to, the memory modules 240/306.

As an example, the client processing module 204 and memory module 240, the authentication controller 304 and the memory module 306 may reside in their respective ASICs. The memory modules 240 and 306 may also be integrated into the client processing module 204 and the authentication controller 304 respectively. In an embodiment, the memory module 240/306 may include a cache memory for storing temporary variables or other intermediate information during execution of instructions to be executed by the client processing module 204, and the authentication processor module 300 respectively. The memory modules 240/306 may also include non-volatile memory for storing instructions to be executed by the client processing module 204, and the authentication processor module 300 respectively. For example, the memory modules 240 and 306 may store instructions to be executed by the hash function module 232 and 308 respectively.

The memory modules 240 and 306 may store the data block 138, the hash value 152, and other data in accordance with an embodiment of the disclosure. For another example, but without limitation, the memory module 306 stores the received hash value 152, the hash value receiving time ($t_1$) of the received hash value 152, the estimated transmission signal client receiving time ($t_{2est}$) the received data block 138, the hash value comparison result 320, the time difference 322, the signal comparison result 324, the contents of the alleged transmission signal data comprising some or all of the digital samples 226, and other data in accordance with an embodiment of the disclosure.

Those skilled in the art will understand that the various illustrative blocks, modules, circuits, and processing logic described in connection with the embodiments disclosed herein may be implemented in hardware, computer-readable software, firmware, or other combination thereof. To clearly illustrate this interchangeability and compatibility of hardware, firmware, and software, various illustrative components, blocks, modules, circuits, and steps are described generally in terms of their functionality.

In some embodiments, the system 200-300 may comprise any number of processor modules, any number processing modules, any number of memory modules, any number of transmitter modules, and any number of receiver modules suitable for their operation described herein. The illustrated system 200-300 depicts a simple embodiment for ease of description. These and other elements of the system 200 or system 300 are interconnected together, allowing communication between the various elements of system 200-300. In one embodiment, these and other elements of the system 200-300 may be interconnected together via a respective data communication bus (not shown).

A transmitter module and the receiver module may be located in each of the client processing module 204, and the authentication processor module 300 respectively coupled to their respective shared antenna (not shown). Although in a simple module only one shared antenna is required, more sophisticated modules may be provided with multiple and/or more complex antenna configurations. Additionally, although not shown in this FIGS. 2-3, those skilled in the art will recognize that a transmitter may transmit to more than one receiver, and that multiple transmitters may transmit to the same receiver.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

In this manner, systems 200 and 300 greatly reduce the opportunity for a spoofer to take advantage of the time difference between collecting data and transmitting data.

Figure 4:
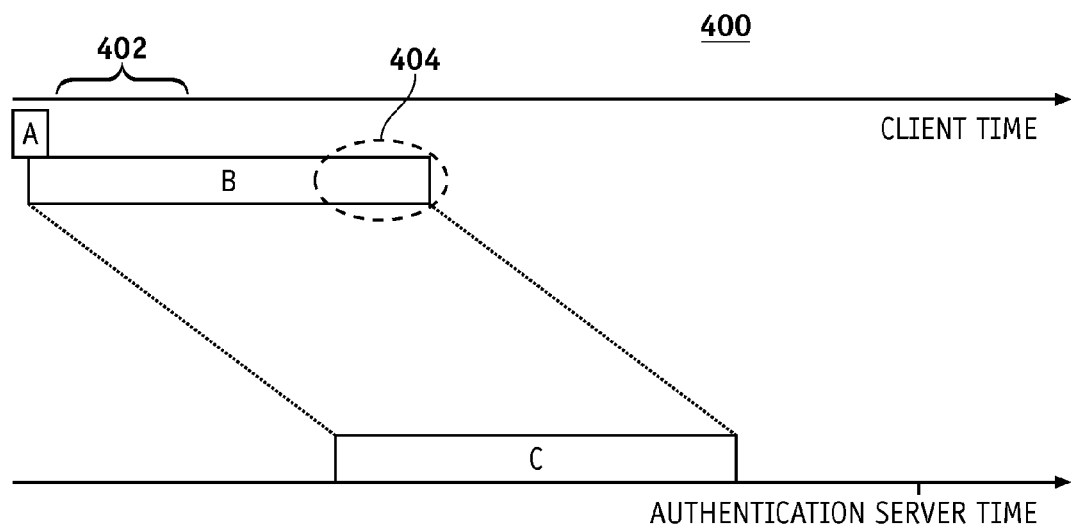
FIG. 4 is an illustration of an existing authentication timing diagram 400 showing how an authentication process without using a hash function may cause a spoofing problem.

FIG. 4 is an illustration of an existing authentication timing diagram 400 showing how an authentication process without using a hash function may cause a spoofing problem. A client device (not shown) collects satellite data during a time block A. The time block A may be about 10 milliseconds in this example. During a time block B the client device transmits data such as satellite signal samples to an authentication server (not shown). The time block B may be several seconds in this example. During a time block C the authentication server receives the data (satellite signal samples) from the client device. During a time interval 402 a spoofer of the client device may fabricate false data and replace data at nearly an end 404 of the time block B that may result in a false positive authentication.

Various methods may be used by a spoofer to spoof a time and/or location authentication server using false digital samples. For example, the spoofer may need a significant amount of time to generate the false digital samples and spoof the authentication server causing the authentication server to incorrectly authenticate the time and/or location of the client device. Since an amount of digital sample data transmitted from a client to an authentication server may be potentially large compared to a communication bandwidth between them, a significant amount of time may be necessary just to transmit the digital sample data.

Embodiments of the disclosure uses a hash function that greatly reduces an opportunity for a spoofer to take advantage of the time interval 402 to fabricate false data and replace data at near the end 404 of the data block B that may result in a false positive authentication.

Figure 5:
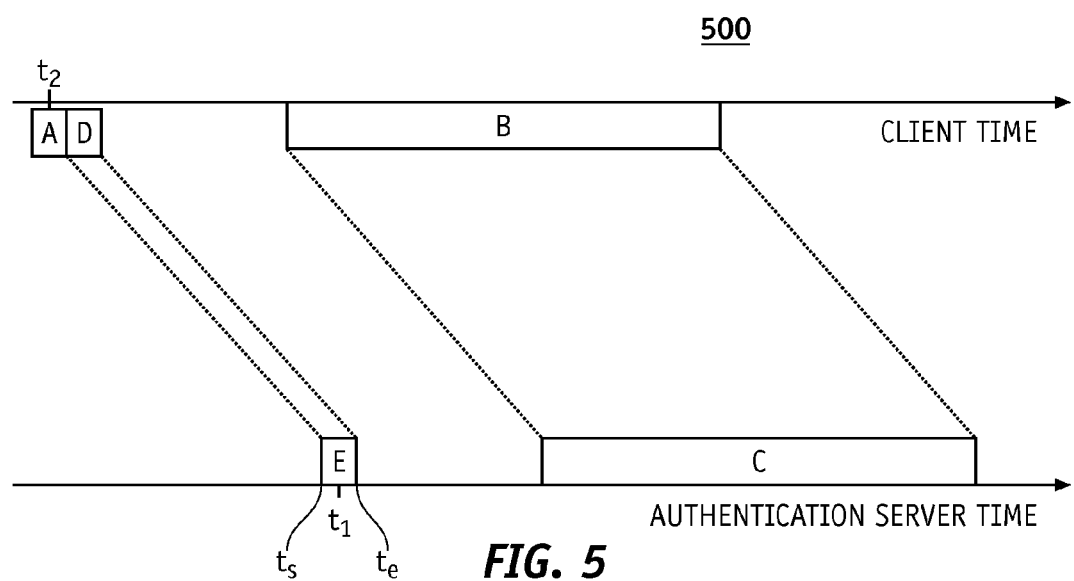
FIG. 5 is an illustration of an authentication timing diagram showing an authentication process using a hash function and a legitimate-valid user that can prevent spoofing according to an embodiment of the disclosure.

FIG. 5 is an illustration of an authentication timing diagram 500 showing an authentication process using a hash function and a legitimate-valid user that can prevent spoofing according to an embodiment of the disclosure. FIG. 5 shows an authentication process with the hash value 152 where a legitimate (valid) client device 108 is attempting to transmit data to the authentication server 112 according to an embodiment of the disclosure. The client device 108 collects digital samples such as digital samples 226 of the client received satellite signals 146 at time $t_2$, also shown as time block A.

Figure 8:
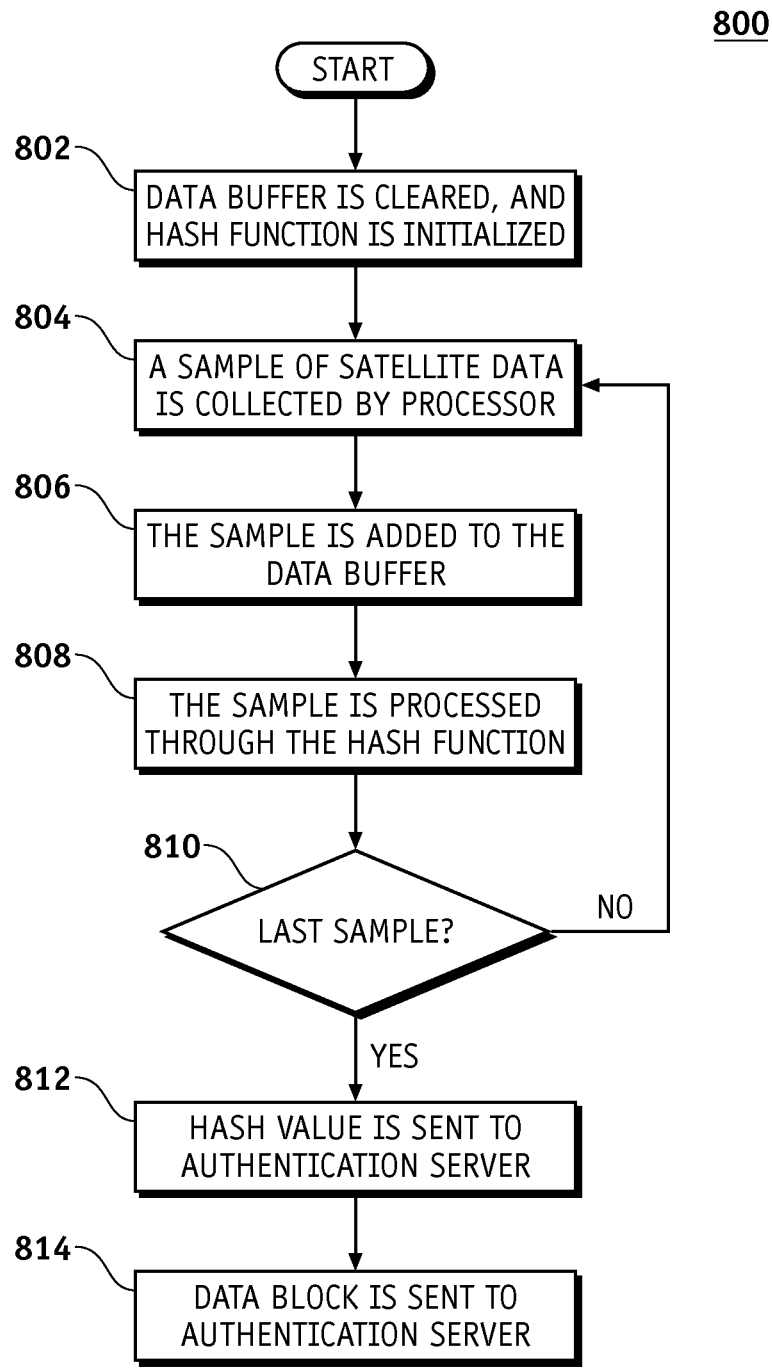
FIG. 8 is an illustration of an exemplary flowchart showing an authentication process that can be performed by a client device according to an embodiment of the disclosure.

The time block A may be about 10 milliseconds in this example. Substantially immediately after collecting the digital samples 226, the hash value 152 based on the digital samples 226 is generated at the client device 108 as explained above. The client device 108 transmits the hash value 152 to the authentication server 112 during a time block D which may take about 1 millisecond in this example (FIG. 8, task 812). The authentication server 112 receives the alleged hash value 152 at the hash value receiving time ($t_1$), also shown as time block E with a start time ts and an end time te, and stores the hash value receiving time ($t_1$) which is a time between or inclusive of ts and te. At a later time, the client device 108 transmits the collected digital samples 226 from the data block 138 (during time block B) and the authentication server 112 receives the alleged collected digital samples from the data block 138 (during time block C).

As explained above, the hash function module 232 of the authentication processor 300 of the authentication server 112 produces the computed hash value 332 for the authentication server 112. In this example, in an absence of transmission or other errors, the computed hash value 332 matches the alleged hash value 152 supplied by the client device 108 since the example comprises a legitimate-valid user. This validates that the digital samples 226 must have been collected by the client device 108 before the hash value receiving time ($t_1$). For example, if the digital samples 226 were fabricated after value receiving time ($t_1$), then the cryptographic hash value 152 and the one associated with the digital samples 226 would not match.

Also, in this example that assumes a (valid) client device 108, the authentication server 112 processes the digital samples 226 to estimate the time $t_{2est}$, at which the client device 108 collected the digital samples 226 thus the $t_{2est}$ is an estimated transmission signal client receiving time. In a valid case, $t_1$ minus $t_{2est}$ is a sufficiently small value that accounts for transmission delay times, but does not provide enough time for a spoofer to have likely created false digital samples. False digital samples may comprise, for example, false satellite data which may be used to replace data block B with data to create a false geothentication signal that may cause a false positive authentication.

As explained above hash value receiving time ($t_1$) is the time when the authentication server 112 receives the alleged hash value 152 and $t_2$ is a time when the client device 108 collects the digital samples 226 of the client received satellite signals 146. The authentication processor 300 stores the hash value receiving time ($t_1$) and computes the estimated transmission signal client receiving time ($t_{2est}$) at which the client device 108 collected the digital samples 226 based on the alleged transmission signal data contained in the received data block 138.

Figure 6:
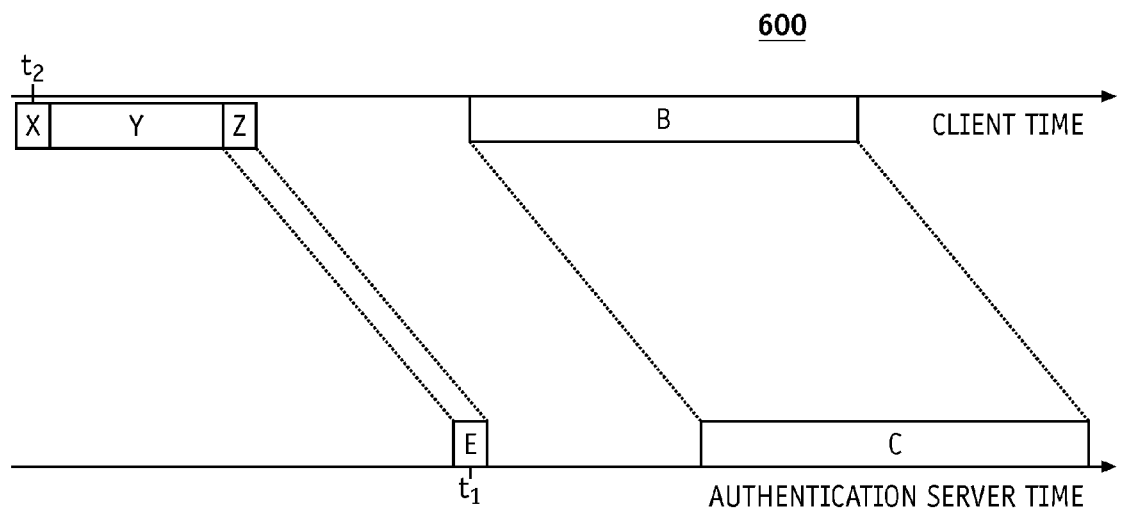
FIG. 6 is an illustration of an authentication timing diagram with a hash function and with a non-valid user such as a spoofer according to an embodiment of the disclosure.

FIG. 6 is an illustration of an authentication timing diagram with a hash function and with a non-valid user such as a spoofer according to an embodiment of the disclosure. The authentication timing diagram 600 shows where a non-legitimate client device such as a spoofer is attempting to transmit data to the authentication server 112. FIG. 6 illustrates an attempt by a spoofer to spoof an authentication server 112. The spoofer may collect the transmitted data signal at time $t_2$, also shown as X. The spoofer may then need an amount of time Y to generate false digital data. The spoofer may then use the false digital data to create a counterfeit hash value (message digest) and send it to the authentication server 112 during time block Z, the authentication server 112 may receive the hash value 152 at time $t_1$ also shown as E.

The client device 108 may later send the false digital data to the authentication server 112. The spoofer attempts to make the false digital data such that the authentication server 112 matches it to the received hash value 152. However, when the false digital data is processed to compute the estimated transmission signal client receiving time ($t_{2est}$), $t_1$ minus $t_{2est}$ is a long enough time period (FIG. 10, task 1010) to have allowed the spoofer to generate false digital data. In this example, a threshold for $t_1$ minus $t_{2est}$ has been established such that a time period giving a spoofer sufficient time to generate the false digital data, etc. is not acceptable. Therefore, the authentication server would not allow the client device 108 to be authenticated based on the false digital data. Thus, the authentication would reject the false digital data. There may be additional actions taken by the authentication server 112 at this time as discussed previously.

FIG. 7 is an illustration of a schematic block diagram 700 showing an authentication challenge process according to an embodiment of the disclosure. The authentication server 112 may send a request signal 704 to the client device 108 challenging the client device 108. This challenging may be carried out in a variety of ways.

In an embodiment, the client device 108 may be operating as part of a defined process for authentication and/or re-authentication, and may send hash value(s) 152 as defined by that process. For example, as part of the defined process, the client device 108 may be asked to transmit the hash value 152, for example, every 5 seconds, every 10 seconds, every 1 minute, every 1 hour, every 1 day, or other time interval which may be dependent on a level of security desired for an application.

For example, high security applications may require that the client device 108 transmit the hash value 152 continuously as part of the defined process. For example, the client device 108 may transmit the hash value 152 every 5 to 10 seconds in order to authenticate and access a protected resource as well as to continue to maintain access to the protected resource during an associated session.

During this time, the authentication server 112 may randomly or otherwise, challenge the client device 108 by sending a request signal 704 to the client device 108 to send the data block 138 associated with a particular hash value 152 as appropriate to authenticate the client device 108. Alternatively, in an alternate embodiment, the authentication server 112 may send a request signal 704 to the client device 108 challenging the client device 108 to transmit the data block 138 associated with the transmitted hash value 152 to provide a received data block 138 at the authentication server 112.

However, while the challenge may be done once a hash value 152 has been received, it should be noted that the authentication server 112 may additionally send a request to the client device 108 to modify how it transmits the hash value(s) 152 and associated data block(s) 138. In an embodiment, the authentication server 112 may send a request to the client device 108 requesting the client device 108 transmit the hash value 152 or the data block 138 in, for example, at least one of the following ways: sporadic, scheduled, or an on-demand fashion. This transmission control may further assist in reducing a potential for spoofing and/or other threats such as botnets.

In some embodiments, challenges may be issued based on reception latency. Since some packets are delayed more than others, time can be better bound when a packet is received that has a low latency. In an embodiment, a challenge is a function of a latency of reception of the hash value 152, where lowest latency hash values trigger a challenge. In another embodiment, a challenge may be a combination of a random challenge and a low latency challenge.

The client device 108 may be asked by the authentication server 112 to transmit the hash value 152 as part of an authentication process in order to initiate a session and remain active within a session of accessing a protected resource, such as data in a cloud computing. The client device 108 may originally be authenticated at an initiation of the session. The authentication server 112 may further request in an on-demand fashion that the client device 108 transmit the data block 138 or the collected digital samples 226 based on specific parameters.

For example, authentication processor 300 may request a data block associated with a specific time such that the authentication server 112 can validate the received hash value 152 as it determines necessary. The client device 108 may then transmit the data block 138 via a data signal 706 based on the authentication server 112 specification. Reoccurrences of authentication in a sporadic, scheduled, or on-demand fashion may assist in reducing the potential for spoofing and/or other threats such as botnets.

FIGS. 8-12 are illustration of exemplary authentication processes 800-1200 according to embodiments of the disclosure. The various tasks performed in connection with the processes 800-1200 may be performed by software, hardware, firmware, a computer-readable medium having computer executable instructions for performing the process method, or any combination thereof. The processes 800-1100 may be recorded in a computer-readable medium such as a semiconductor memory, a magnetic disk, an optical disk, and the like, and can be accessed and executed, for example, by a computer CPU such as the client processing module 204, and the authentication processor module 300 respectively in which the computer-readable medium is stored.

It should be appreciated that processes 800-1200 may include any number of additional or alternative tasks, the tasks shown in FIGS. 4-6 need not be performed in the illustrated order, and processes 800-1200 may be incorporated into a more comprehensive procedure or process having additional functionality not described in detail herein. In some embodiments, portions of the processes 800-1200 may be performed by different elements of the environment 100, systems 200-300 such as: the client device 108, the authentication server 112, etc. Processes 800-1200 may have functions, material, and structures that are similar to the embodiments shown in FIGS. 1-3. Therefore common features, functions, and elements may not be redundantly described here.

FIG. 8 is an illustration of an exemplary flowchart showing an authentication process 800 that can be performed by the client device 108 according to an embodiment of the disclosure. In task 802, the data buffer 230 is cleared and the hash function module 232 is initialized. In task 804, a sample of the client received satellite signal 146 is collected by the client processing module 204 to provide the digital samples 226. After some quantity of the digital samples 226 is collected—for example, a byte, a word, or some other specified number of bits—that sample data is added to the data buffer 230 in task 806, and the same sample data is used as input to the hash function module 232 in task 808. After tasks 806 and 808 (which may be performed in reverse order), it is determined in task 810 whether the sample just collected was the final sample among the digital samples 226.

This determination may be based on a wide variety of factors, such as reaching a threshold data quantity, passing of a specified time period since a last initialization, or by a remote request from the gateway 150 or the authentication server 112. If the sample collected is not a final sample, then the process 800 returns to task 804 and another sample is collected. If the sample collected is the final sample, then the hash value 152 is substantially immediately sent to the authentication server 112 in task 812. Sometime later, but before any more data is added to the data buffer 230, content of the data buffer 230 is sent to the authentication server 112 via the data block 138 in task 814. The process 800 may then be restarted immediately, may be restarted after some period of time has passed, or may not be restarted again until requested by a user, a gateway, a network management entity, or an authentication server.

Figure 9:
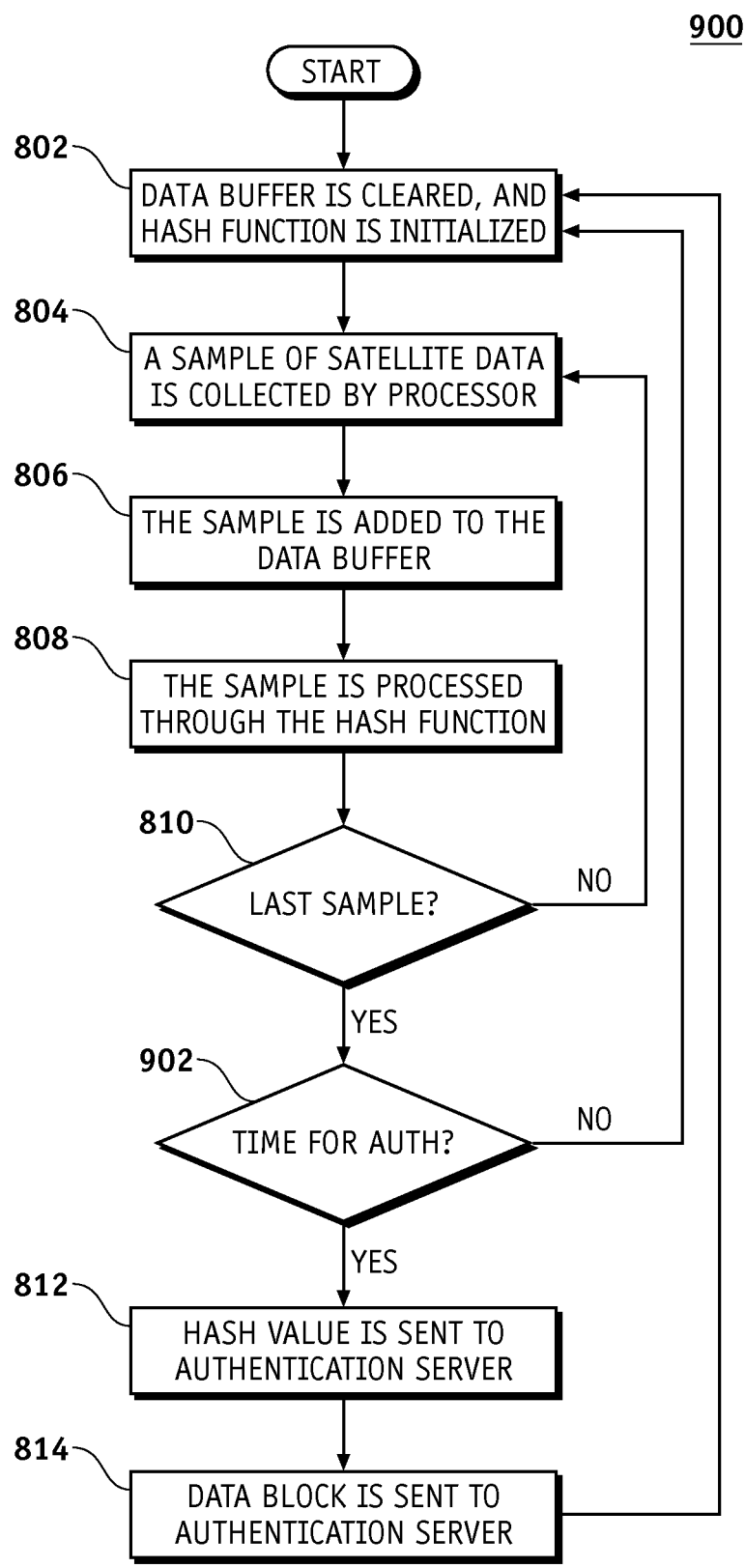
FIG. 9 is an illustration of an exemplary flowchart showing an authentication process that can be performed by a client device according to an embodiment of the disclosure.

FIG. 9 is an illustration of an exemplary flowchart showing an authentication process 900 that can performed by the client device 108 according to an embodiment of the disclosure. Process 900 may have functions, material, and structures that are similar to the embodiments shown in process 800. Therefore common features, functions, and elements may not be redundantly described here.

In one embodiment, the process 900 is executed in a substantially continuous loop as shown in FIG. 9. In the embodiment shown in FIG. 9, after a final sample of the digital samples 226 of the client received satellite signal 146 is identified by the client receiver module 200 in the inquiry task 810, another check is performed in an inquiry task 902 to determine if it is time for geothentication data to be sent to the authentication server 112. This may be necessary because a data bandwidth of transmission signal samples such as the digital samples 226 sampled by the client device 108 may exceed a communication channel bandwidth of communication between the client device 108 and the authentication server. In this manner, the final sample of the client received satellite signal 146 is identified and transmitted to the authentication processor 300 of the authentication server 112 based on the bandwidth of communication between the client device 108 and the authentication processor 300.

Additionally, before any more data is added to the data buffer 230, the collected digital samples 226 from the data buffer 230 are sent to the authentication processor 300. This process may then be restarted substantially immediately, after some period of time has passed, or may not be restarted again until requested by client device 108, the gateway 150, a network management entity, or the authentication processor 300.

In this case, the determination of the inquiry task 902 may be made by the client device 108 (user). The determination of the inquiry task 902 may also be made by a request from the gateway 150 or the authentication server 112. The determination of the inquiry task 902 may also be made at a periodic interval—for example, the digital samples 226 may be sent every 5 seconds. In either case, once the determination of the inquiry task 902 is made, whether or not the data block 138 and the cryptographic hash value 152 is sent to the authentication server 112 (tasks 812 and 814), the process 900 returns to task 802, the data buffer 230 and the hash function module 232 are initialized, and the process 900 starts again.

Figure 10:
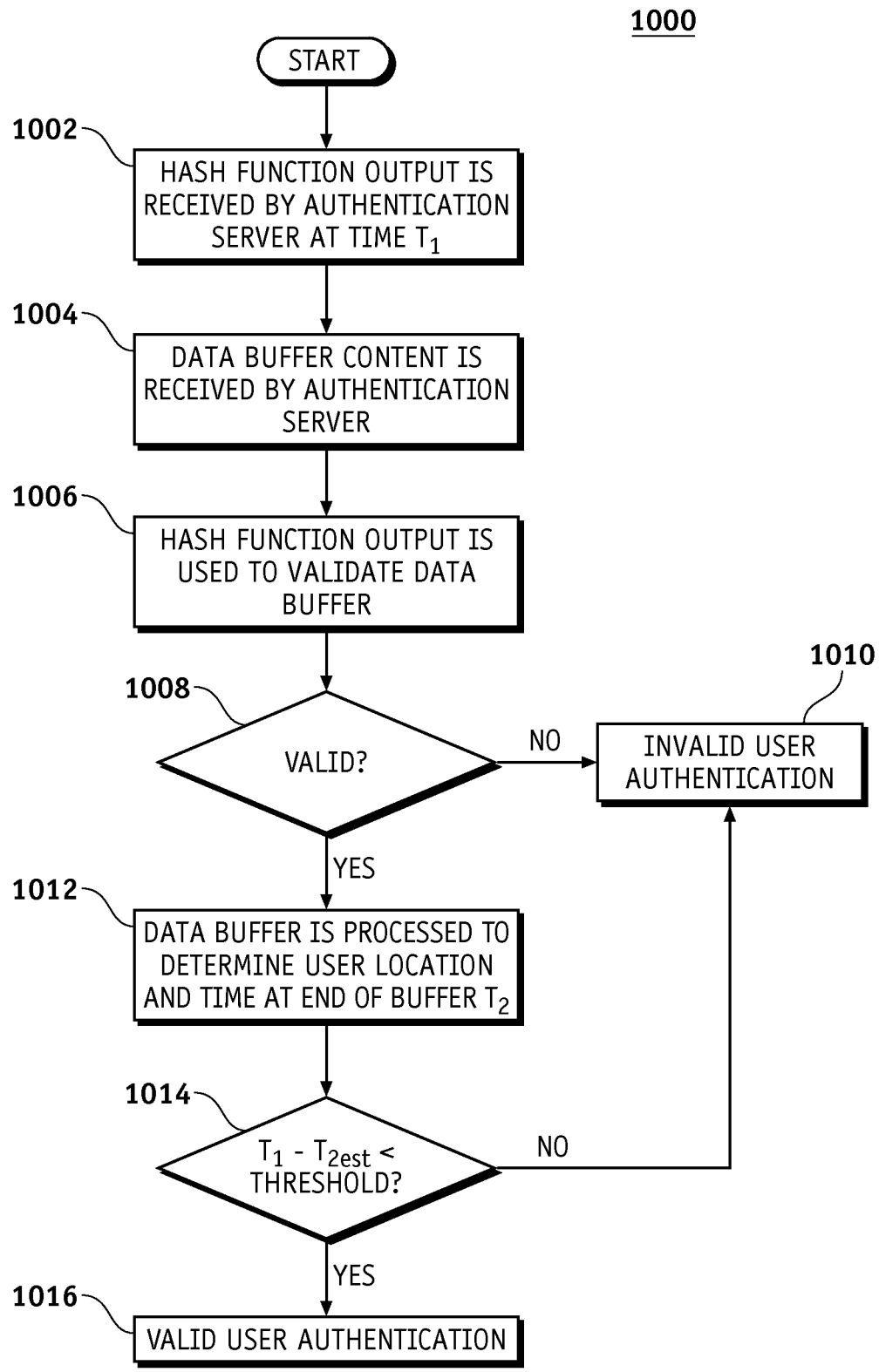
FIG. 10 is an illustration of an exemplary flowchart showing an authentication process that can be performed by an authentication processor according to an embodiment of the disclosure.

FIG. 10 is an illustration of an exemplary flowchart showing an authentication process 1000 that can performed by the authentication processor 300 to authenticate the location 122 of the client device 108 according to an embodiment of the disclosure. The authentication processor 300 receives a hash function output (hash value 152) from the client device 108 at the hash value receiving time ($t_1$) in task 1002. The hash value receiving time ($t_1$) of the received hash value 152 is measured with high accuracy. In one embodiment, a GPS receiver is used as a timing reference for the accurate measurement of the hash value receiving time ($t_1$). Sometime later, in task 1004, the authentication processor 300 receives content of the data buffer 230 in the data block 138 from the client device 108. The data buffer content is alleged to comprise valid sampled RF data (digital samples 226).

A computed hash value 332 is generated using the data buffer content of the received data block 138, and the computed hash value 332 is compared to the received hash value 152 in task 1006. If the computed hash value 332 and the received hash value 152 do not match, then the client device 108 location authentication fails in task 1010. In task 1010 corrective action may be taken such as denying access to the client device 108, informing the client device 108 of the error, informing a gateway 150 of the error, informing another network management entity of the error, directing the client device 108 to a honeypot, or informing a law enforcement authority of the error.

If the computed hash value 332 and the received hash value 152 match, then the data buffer content of the data block 138 is used to compute or authenticate an accurate location of the client device 108 using standard geothentication techniques in task 1012. Also in task 1012, the estimated ($t_{2est}$) transmission signal client receiving time ($t_{2est}$) which is an accurate estimate of time $t_2$ at which the client device 108 received the end of the data buffer is ($t_{2est}$) calculated. The estimated transmission signal client receiving time ($t_{2est}$) may be calculated based on the alleged transmission signal data contained in the received data block 138 by the satellite navigation processing module 310 using standard geothentication techniques. The time difference 322 ($t_1-t_{2est}$) is calculated in inquiry task 1014. In the inquiry task 1014, if time difference 322 ($t_1-t_{2est}$) is below a time threshold, then a valid hash value 152 match was received in a timely manner from the client device 108 and the client device 108 location is authenticated in task 1016. If the time difference 322 ($t_1-t_{2est}$) is greater than the time threshold, then a valid hash value 152 match was not received in a timely manner from the client device 108 and the client device 108 location is not authenticated in task 1010.

The time threshold can be any useful value. In an embodiment, the time threshold is a function of a distance (d) between a calculated location of the client device 108 and a location of the authentication server. In the embodiment, the time threshold is also a function of an expected minimum speed (V) of information traveling from the client device 108 to the authentication server 112. A path from the client device 108 to the authentication server may not be straight. In an embodiment, the time threshold is also a function of a reasonable delay factor (δ) to account for the processing and transmission time. For example, the time threshold (T) might be calculated to be: T=δ+d/V.

In some embodiments, a method for time or location authentication based on a hash function is executed with continuous handshaking between the client device 108 and the authentication server 112. This may be necessary because the digital samples 226 of a transmission signal sampled by the client device 108 may exceed a bandwidth of communication between the client device 108 and the authentication processor 300. Therefore, it may not be possible for all transmission signal samples to be sent.

Figure 11:
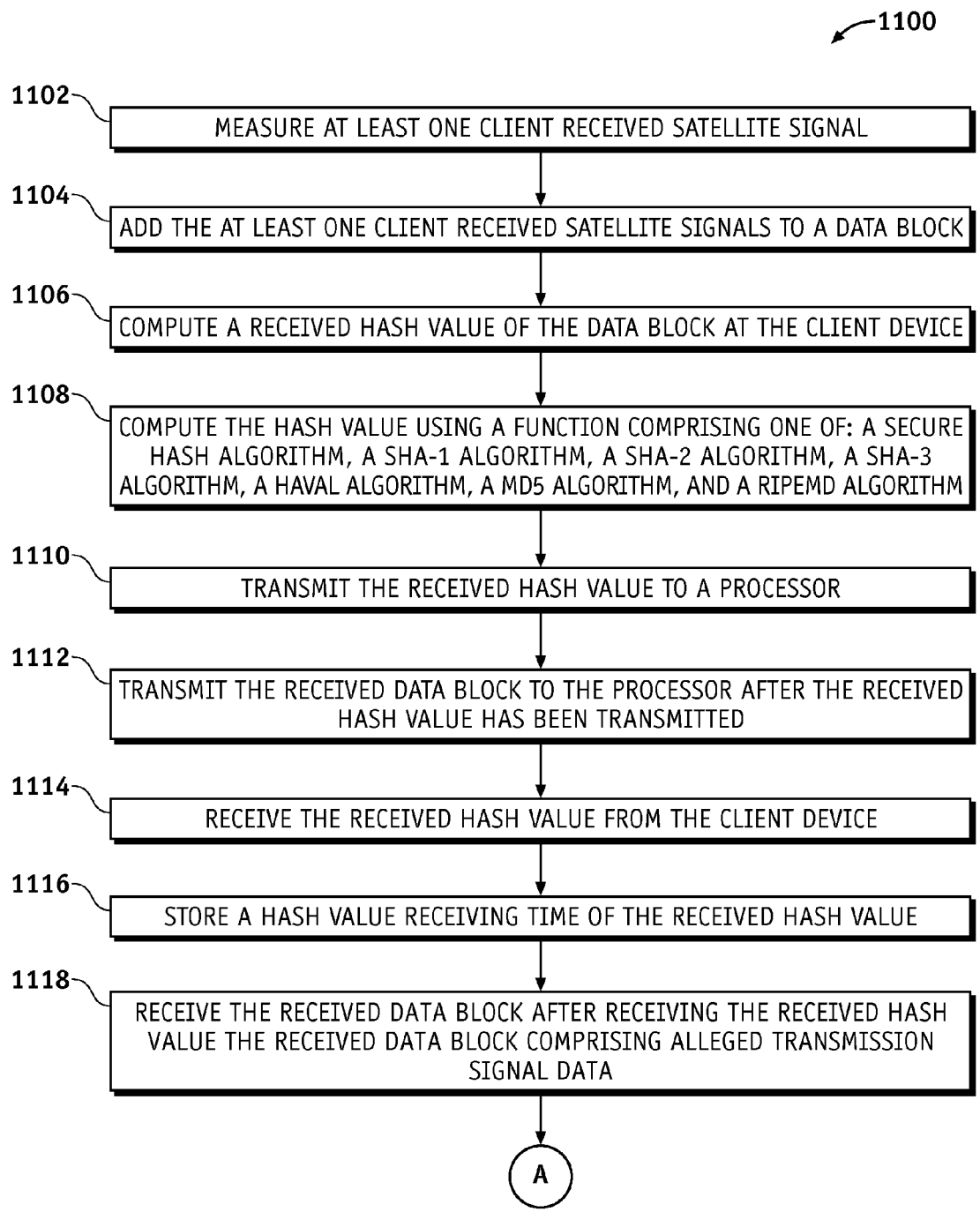
FIG. 11 is an illustration of an exemplary flowchart showing an authentication process that can be performed by a client device and an authentication processor according to an embodiment of the disclosure.
Figure 11:
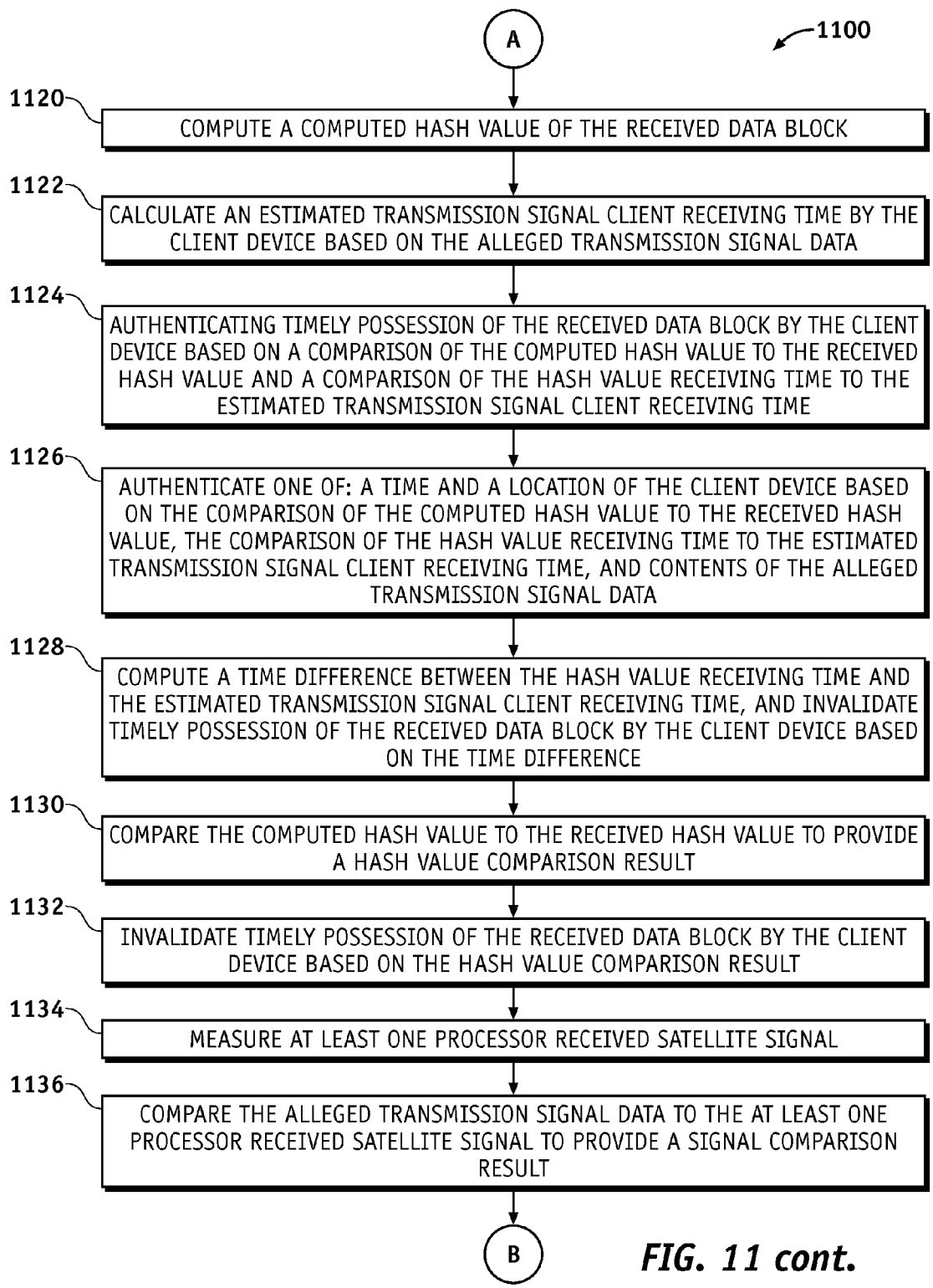
Figure 11:
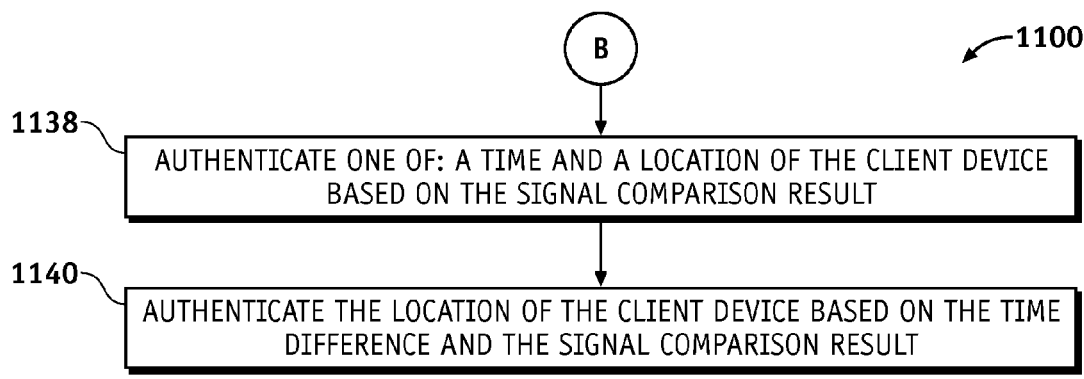

FIG. 11 is an illustration of an exemplary flowchart showing a time and/or location authentication process 1100 according to an embodiment of the disclosure. The various tasks performed in connection with the process 1100 may be performed by software, hardware, firmware, a computer-readable medium having computer executable instructions for performing the process method, or any combination thereof. The process 1100 may be recorded in a computer-readable medium such as a semiconductor memory, a magnetic disk, an optical disk, and the like, and can be accessed and executed, for example, by a computer CPU such as the client processing module 204, and the authentication processor module 300 in which the computer-readable medium is stored.

It should be appreciated that process 1100 may include any number of additional or alternative tasks, the tasks shown in FIG. 11 need not be performed in the illustrated order, and process 1100 may be incorporated into a more comprehensive procedure or process having additional functionality not described in detail herein. In some embodiments, portions of the process 1100 may be performed by different elements of the environment 100 and systems 200-300 such as: the client device 108, the authentication server 112, etc. Process 1100 may have functions, material, and structures that are similar to the embodiments shown in FIGS. 1-7. Therefore common features, functions, and elements may not be redundantly described here.

Process 1100 may begin by measuring at least one client received satellite signal 146 (task 1102). The client received satellite signal 146 may be transmitted from, for example but without limitation, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, an Iridium™ satellite, a GlobalStar satellite, or other satellite that may be utilized for position, navigation, or timing related applications.

The satellite may also comprise at least one satellite from a future constellation, such as the currently planned Iridium™ NEXT constellation. The client received satellite signals 146 may comprise client received satellite navigation signals, or other signals. Additionally, each of the satellites 102-106 may comprise a low Earth orbiting (LEO) satellite, a medium Earth orbiting (MEO) satellite, and/or a geosynchronous Earth orbiting (GEO) satellite. An RF satellite signal may comprise at least a portion of geolocation information.

Process 1100 may then continue by adding the at least one client received satellite signals 146 to the data block 138 (task 1104).

Process 1100 may then continue by computing a hash value 152 of the data block 138 at the client device 108 (task 1106).

Process 1100 may then continue by computing the hash value 152 using a function comprising one of: a Secure Hash Algorithm, a SHA-1 algorithm, a SHA-2 algorithm, a SHA-3 algorithm, a NAVAL algorithm, a MD5 algorithm, and a RIPEMD algorithm (task 1108).

Process 1100 may then continue by transmitting the hash value 152 (received hash value 152) to the authentication processor 300 (task 1110).

Process 1100 may then continue by transmitting the received data block 138 to the authentication processor 300 after the received hash value 152 has been transmitted (task 1112).

Process 1100 may then continue by receiving the received hash value 152 from the client device 108 (task 1114).

Process 1100 may then continue by storing a hash value receiving time ($t_1$) of the received hash value 152 (task 1116).

Process 1100 may then continue by receiving the received data block 138 after receiving the received hash value 152, the received data block 138 comprising alleged transmission signal data (task 1118).

Process 1100 may then continue by computing a computed hash value 332 of the received data block 138 (task 1120).

Process 1100 may then continue by calculating an estimated transmission signal receiving time by the client device 108 based on the alleged transmission signal data (task 1122).

Process 1100 may then continue by authenticating timely possession of the received data block 138 by the client device 108 based on a comparison of the computed hash value 322 to the received hash value 152 and a comparison of the hash value receiving time $t_1$ to the estimated transmission signal client receiving time $t_{2est}$ by the client device 108 (task 1124).

Process 1100 may then continue by authenticating one of: a time and a location of the client device 108 based on the comparison of the computed hash value 332 to the received hash value 152; the comparison of the hash value receiving time $t_1$ to the estimated transmission signal client receiving time $t_{2est}$ and contents of the alleged transmission signal data (task 1126).

Process 1100 may then continue by computing the time difference 322 between the hash value receiving time $t_1$ and the estimated transmission signal client receiving time $t_{2est}$, and invalidating timely possession of the received data block 138 by the client device 108 based on the time difference 322 (task 1128).

Process 1100 may then continue by comparing the computed hash value to the received hash value to provide a hash value comparison result 320, (task 1130).

Process 1100 may then continue by invalidating timely possession of the received data block 138 by the client device 108 based on the hash value comparison result 320 (task 1132).

Process 1100 may then continue by measuring at least one processor received satellite signal 148 (task 1134). The processor received satellite signals 148 may comprise processor received satellite signals, or other signals.

Process 1100 may then continue by comparing the alleged transmission signal data to the at least one server received satellite signal to provide a signal comparison result 324 (task 1136).

Process 1100 may then continue by authenticating one of: a time and a location of the client device based on the signal comparison result 324 (task 1138).

Process 1100 may then continue by authenticating the location 122 of the client device 108 based on the time difference and the signal comparison result 324 (task 1140).

Figure 12:
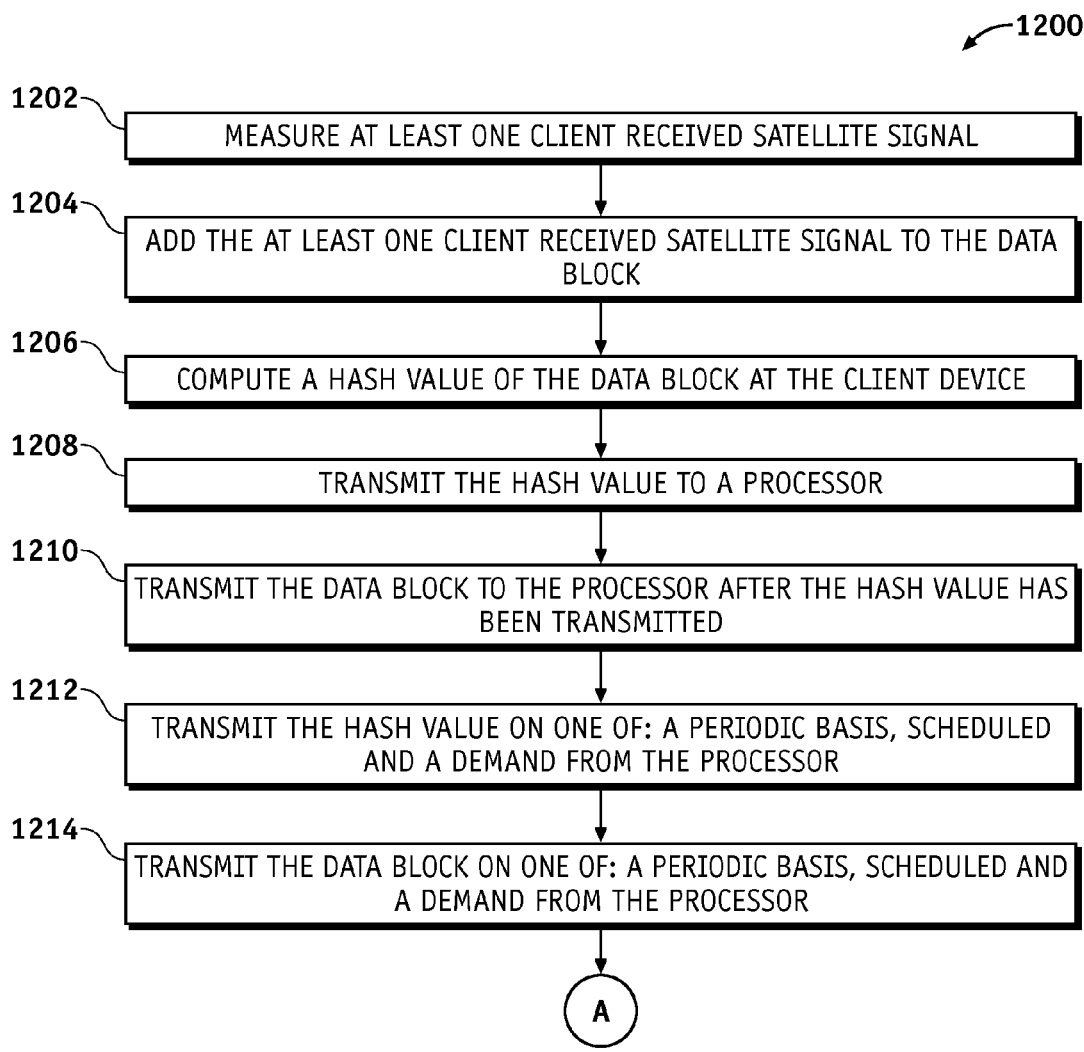
FIG. 12 is an illustration of an exemplary flowchart showing an authentication process that can be performed by a client device according to an embodiment of the disclosure.
Figure 12:
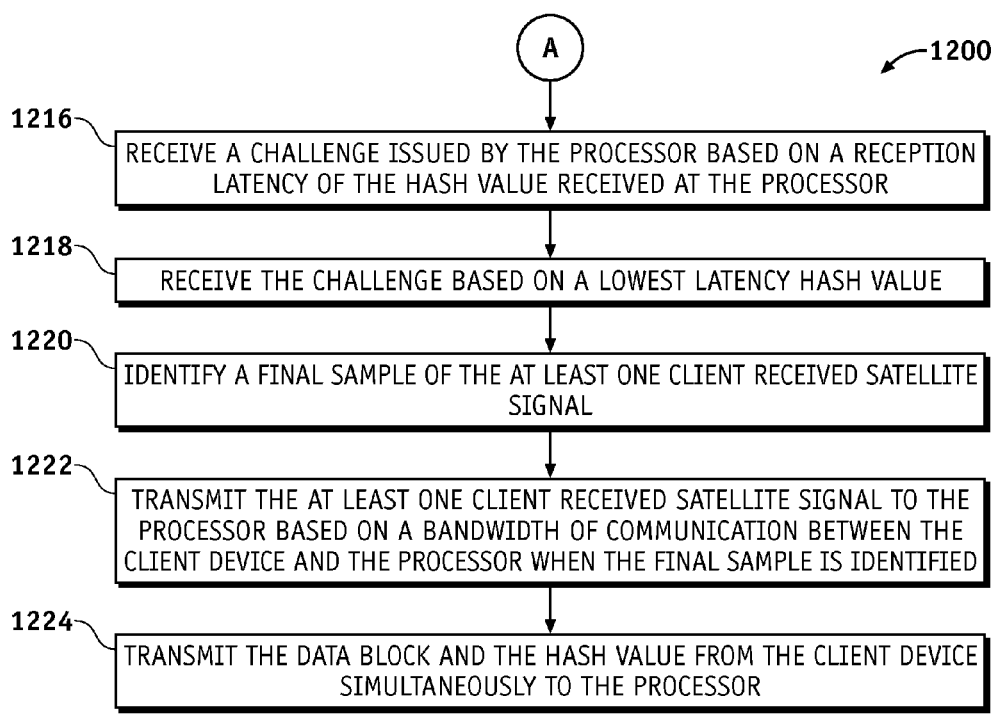

FIG. 12 is an illustration of an exemplary flowchart showing a client time and location authentication process 1200 according to an embodiment of the disclosure. The various tasks performed in connection with the process 1200 may be performed by software, hardware, firmware, a computer-readable medium having computer executable instructions for performing the process method, or any combination thereof. The process 1200 may be recorded in a computer-readable medium such as a semiconductor memory, a magnetic disk, an optical disk, and the like, and can be accessed and executed, for example, by a computer CPU such as the client processing module 204, and the authentication processor module 300 in which the computer-readable medium is stored.

It should be appreciated that process 1200 may include any number of additional or alternative tasks, the tasks shown in FIG. 12 need not be performed in the illustrated order, and process 1200 may be incorporated into a more comprehensive procedure or process having additional functionality not described in detail herein. In some embodiments, portions of the process 1200 may be performed by different elements of the environment 100 and systems 300-400 such as: the client 108, the authentication server 112, etc. Process 1200 may have functions, material, and structures that are similar to the embodiments shown in FIGS. 1-3. Therefore common features, functions, and elements may not be redundantly described here.

Process 1200 may begin by measuring at least one client received satellite signal 146 (task 1202).

Process 1200 may then continue by adding the at least one client received satellite signal 146 to the data block 138 (task 1204).

Process 1200 may then continue by computing a hash value 152 of the data block 138 at the client device 108 (task 1206).

Process 1200 may then continue by transmitting the hash value 152 to the a processor such as the authentication processor 300 (task 1208).

Process 1200 may then continue by transmitting the data block 138 to the authentication processor 300 after the hash value 152 has been transmitted (task 1210). As mentioned above, if multiple channels of communication are available, both the hash value 152 and the data block 138 can be sent substantially simultaneously, but generally the hash value 152 would likely be received first as the hash value 152 generally comprises less data than the data block 138.

Process 1200 may then continue by transmitting the hash value 152 on one of: a periodic basis, and a demand from the authentication processor 300 (task 1212).

Process 1200 may then continue transmitting the data block on one of: a periodic basis, and a demand from the server (task 1214).

Process 1200 may then continue by receiving a challenge issued by the authentication processor 300 based on a reception latency of the hash value 152 received at the authentication processor 300 (task 1216).

Process 1200 may then continue by receiving the challenge based on a lowest latency hash value (task 1218).

Process 1200 may then continue by identifying a final sample of the at least one client received satellite signal 146 (task 1220).

Process 1200 may then continue by transmitting the at least one client received satellite signal 146 to the authentication processor 300 based on a bandwidth of communication between the client device 108 and the authentication processor 300 when the final sample is identified (task 1222).

Process 1200 may then continue by transmitting the data block 138 and the hash value 152 from the client device 108 simultaneously to the authentication processor 300 (task 1224).

The process 800-1200 may further repeat process steps as needed in order to reasonably authenticate or reject the claimant. It should be noted that various aspects of this method may be sporadic, re-occurring (e.g. continuous), on-demand, and/or conform to a schedule. For example, the authentication processor may require that the client receiver provides a claimed message digest and at least a portion of the claimed collected digital samples for every session of time that the client requires authentication. Another example may be that the authentication processor may challenge the client receiver by requiring the client receiver to transmit hash values on a regular re-occurring basis and then may request the client receiver, in an on-demand fashion, to submit the at least a portion of the claimed collected digital samples associated with a specific time determined by the authentication processor such that the authentication processor can validate the time and location of the user as it deems necessary.

The authentication processor 300 may impose additional functions that are not limited to only that which is identified here on the client device in terms of data transmission and data transmission content that may assist in minimizing the ability of a spoofer to gain a false positive geothentication validation.

In some embodiments, a gateway may impose additional processes directly on the client device 108 or by means of the authentication processor 300 to assist with minimizing the ability of the spoofer to gain a false positive geothentication validation or rather a system user who does not have the appropriate authorization privileges for any protected resource that they may be attempting to gain access to.

In this manner, embodiments of the disclosure provide an authentication system that greatly reduces an opportunity for a spoofer to take advantage of the time delay between collecting data and transmitting data.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the client processing module 204, and the authentication processor module 300 each cause the client processing module 204, and the authentication processor module 300 to perform specified operations respectively. Such instructions, generally referred to as "computer program code" or "program code" (which may be grouped in the form of computer programs or other groupings), when executed, enable a method of using a system.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1A-1B, and 2-3 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for authenticating timely possession of a received data block by a client device, the method comprising:
    receiving a received hash value at an authentication server from the client device through a communication network;
    storing a hash value receiving time of the received hash value, the hash value receiving time comprising a time when the received hash value is received from the client device at the authentication server;
    receiving a received data block after receiving the received hash value, the received data block comprising alleged transmission signal data;
    computing a computed hash value of the received data block at the authentication server;
    calculating at the authentication server an estimated transmission signal client receiving time based on the alleged transmission signal data, wherein the estimated transmission signal client receiving time is an estimate of when transmission signal data should be received by the client device; and
    authenticating timely possession of the received data block by the client device based on a comparison of the computed hash value to the received hash value and a comparison of the hash value receiving time to the estimated transmission signal client receiving time.

2. The method of claim 1, further comprising authenticating one of: a time and a location of the client device based on the comparison of the computed hash value to the received hash value, the comparison of the hash value receiving time to the estimated transmission signal client receiving time, and contents of the alleged transmission signal data.

3. The method of claim 1, wherein the received hash value and computed hash value each comprises a cryptographic hash value, and a function used to compute the received hash value and the computed hash value comprises a cryptographic hash function.

4. The method of claim 3, wherein the function comprises one of: a Secure Hash Algorithm, a SHA-1 algorithm, a SHA-2 algorithm, a SHA-3 algorithm, a NAVAL algorithm, a MD5 algorithm, and a RIPEMD algorithm.

5. The method of claim 1, further comprising computing a time difference between the hash value receiving time and the estimated transmission signal client receiving time, and invalidating timely possession of the received data block by the client device based on the time difference.

6. The method of claim 1, further comprising:
    comparing the computed hash value to the received hash value to provide a hash value comparison result; and
    invalidating timely possession of the received data block by the client device based on the hash value comparison result.

7. The method of claim 1, further comprising:
    measuring at least one processor received satellite signal;
    comparing the alleged transmission signal data to the at least one processor received satellite signal to provide a signal comparison result; and
    authenticating one of: a time and a location of the client device based on the signal comparison result.

8. The method of claim 1, further comprising:
    computing the received hash value of the received data block at the client device;
    transmitting the received hash value to a processor; and
    transmitting the received data block to the processor after the received hash value has been transmitted.

9. The method of claim 8, further comprising:
    measuring at least one client received satellite signal; and
    adding the at least one client received satellite signal to the data block.

10. The method of claim 9, wherein the at least one client received satellite signal is transmitted from at least one of the group consisting of: an LEO satellite, an MEO satellite, a GEO satellite, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, an Iridium™ satellite, and an Iridium™ NEXT.

11. An authentication system for authenticating timely possession of a received data block by a client device, the system comprising:
    a processor;
    a processor client-data module coupled to the processor and operable to:
        receive a received hash value at an authentication server from a client device through a communication network; and
        receive a received data block from the client device after receiving the received hash value, the received data block comprising alleged transmission signal data;

a memory module coupled to the processor and operable to store a hash value receiving time of the received hash value, the hash value receiving time comprising a time when the received hash value is received from the client device at the authentication server; and a hash function module coupled to the processor and operable to compute a computed hash value of the received data block at the authentication server;

a transmission signal processing module coupled to the processor and operable to calculate at the authentication server an estimated transmission signal client receiving time by the client device based on the alleged transmission signal data, wherein the estimated transmission signal client receiving time is an estimate of when transmission signal data should be received by the client device; and an authentication controller coupled to the processor and operable to authenticate timely possession of the received data block by the client device based on a comparison of the computed hash value to the received hash value and a comparison of the hash value receiving time to the estimated transmission signal client receiving time.

12. The system of claim 11, further comprising an authentication module coupled to the processor and operable to: authenticate one of: a time and a location of the client device based on the comparison of the computed hash value to the received hash value, the comparison of the hash value receiving time to the estimated transmission signal client receiving time, and contents of the alleged transmission signal data.

13. The system of claim 11, wherein the received hash value and the computed hash value each comprises a cryptographic hash value, and a function used to compute the received hash value and the computed hash value each comprises a cryptographic hash function.

14. The system of claim 13, wherein the function comprises one of: a Secure Hash Algorithm, a SHA-1 algorithm, a SHA-2 algorithm, a SHA-3 algorithm, a NAVAL algorithm, a MD5 algorithm, and a RIPEMD algorithm.

15. The system of claim 11, wherein the authentication controller is further operable to:
compare the computed hash value to the received hash value to provide a hash value comparison result; and
invalidate timely possession of the received data block by the client device based on the hash value comparison result.

16. The system of claim 11, further comprising an authentication module coupled to the processor and operable to:
measure at least one processor received satellite signal;
compare the alleged transmission signal data to the at least one processor received satellite signal to provide a signal comparison result; and
authenticate one of: a time and a location of the client device based on the signal comparison result.

17. The system of claim 11, further comprising a client device operable to:
compute the received hash value of the received data block at the client device;
transmit the received hash value to a processor; and
transmit the received data block to the processor after the received hash value has been transmitted.

18. The system of claim 17, wherein the client device is further operable to:
sample at least one client received transmission signal to provide client received signal samples; and
add the client received signal samples to the received data block.

19. The system of claim 18, wherein the at least one client received transmission signal is transmitted from at least one of the group consisting of: an LEO satellite, an MEO satellite, a GEO satellite, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, an Iridium™ satellite, and an Iridium™ NEXT.

20. The system of claim 17, wherein the received data block is sent from the client device to the processor in response to a request of the processor based on one of: a challenge, and a part of a defined process.

21. The system of claim 17, wherein the received data block is sent from the client device to the processor based on one of: a periodic basis, scheduled, and a demand from the processor.

22. The system of claim 11, wherein the authentication controller is further operable to issue a challenge based on a reception latency of the received hash value.

23. The system of claim 22, wherein the authentication controller is further operable to issue the challenge based on at least one of the group consisting of: a lowest latency hash value, and a random challenge.

24. A non-transitory computer readable storage medium comprising computer-executable instructions for authenticating timely possession of a received data block by a client device, the computer-executable instructions comprising:
measuring at least one client received satellite signal at a transmission signal client receiving time at a client device;
adding the at least one client received satellite signal to a data block;
computing a hash value of the data block at the client device;
transmitting the hash value through a communication network to a processor at an authentication server, wherein the hash value is received from the client device at the authentication server at a hash value receiving time; and
transmitting the data block to the processor after the hash value has been transmitted and for authentication by the authentication server of timely possession of the data block by the client device based on a comparison of the hash value to a computed hash value of the data block at the authentication server and a comparison of the hash value receiving time to an estimate of the transmission signal client receiving time.

25. The non-transitory computer readable storage medium of claim 24, the computer-executable instructions further comprising transmitting the hash value on one of: a periodic basis, scheduled, and a demand from the processor.

26. The non-transitory computer readable storage medium of claim 24, the computer-executable instructions further comprising transmitting the data block on one of: a periodic basis, scheduled, and a demand from the processor.

27. The non-transitory computer readable storage medium of claim 24, the computer-executable instructions further comprising receiving a challenge issued by the processor based on a reception latency of the hash value received at the processor.

28. The non-transitory computer readable storage medium of claim 27, the computer-executable instructions further comprising receiving the challenge based on a lowest latency hash value.

29. The non-transitory computer readable storage medium of claim 24, the computer-executable instructions further comprising:

identifying a final sample of the at least one client received satellite signal; and transmitting the at least one client received satellite signal to the processor based on a bandwidth of communication between the client device and the processor when the final sample is identified.

30. The non-transitory computer readable storage medium of claim 24, the computer-executable instructions further comprising transmitting the data block and the hash value from the client device simultaneously to the processor.

* * * * *